(12) United States Patent
Nimoda

(10) Patent No.: US 6,266,790 B1
(45) Date of Patent: Jul. 24, 2001

(54) BIT ERROR MEASUREMENT CIRCUIT

(75) Inventor: Hiroshi Nimoda, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 09/050,426

(22) Filed: Mar. 31, 1998

(30) Foreign Application Priority Data

Mar. 31, 1997 (JP) .................................. 9-081613

(51) Int. Cl.$^7$ .............................. G06F 11/00; G06F 7/02
(52) U.S. Cl. ........................................... 714/704; 714/819
(58) Field of Search ..................................... 714/704, 715, 714/736, 819, 824, 43, 48, 49, 56, 703, 812

(56) References Cited

U.S. PATENT DOCUMENTS 4,617,664 * 10/1986 Aichelmann, Jr. et al. ......... 714/758
5,056,089 * 10/1991 Furuta et al. ........................ 714/703
5,329,538 * 7/1994 Kawano et al. ..................... 714/812

FOREIGN PATENT DOCUMENTS 8-149112   6/1996 (JP) .

* cited by examiner

Primary Examiner—Christine T. Tu
(74) Attorney, Agent, or Firm—Pillsbury Winthrop LLP

(57) ABSTRACT

A bit error measurement circuit of the present invention which can measure for a bit error precisely. The bit error measurement circuit comprises: a memory circuit for memorizing one period data of a signal to be measured as a reference signal, an error detection circuit for detecting erroneous bits of the signal to be measured, an error counter for counting the erroneous bits detected by the error detection circuit, and a plurality of terminals for inputting a control signal to control the memory circuit from outside of the bit error measurement circuit; wherein the reference signal memorized in the memory circuit is inspected outside the bit error measurement circuit, and the erroneous bits are corrected on the basis of the control signal fed from the outside of bit error measurement circuit, when there are erroneous bits.

8 Claims, 9 Drawing Sheets

BIT ERROR MEASUREMENT CIRCUIT

BACKGROUND OF THE INVENTION

1. Field of the Invention

The present invention relates to a bit error measurement circuit for evaluating a device such as an IC, a transmission device, a transmission line or the like. In particular, the present invention relates to a bit error measurement circuit which evaluates the above-described devices by using a test signal pattern set by a user arbitrarily.

2. Description of Related Art

In a bit error measurement, a test signal is transmitted by a transmitter and is received by a receiver through an object to be measured, e.g., a device such as an IC, a transmission device, a transmission line or the like. By carrying out a bit error measurement for the test signal received by a receiver, the measuring object is evaluated. In a pattern of the test signal, a pseudo-random pattern or a pattern set by a user arbitrarily is used frequently.

A transmitter transmits the test signal having the above-described pattern periodically and repeatedly. A receiver receives the test signal transmitted by a transmitter and memorizes one period of the test signal in a memory thereof by a pull-in operation, so that a reference signal is generated in a receiver. The following test signal transmitted by a transmitter is considered as a signal to be measured, and thereafter each bit of the signal to be measured is compared with that of the reference signal. As a result, bit errors are detected and are counted, so that a bit error rate is calculated.

In such a conventional bit error measurement circuit, for example, Japanese Patent Publication (Unexamined) No. Tokukai-Hei 8-149112 discloses a bit error measurement circuit. The conventional bit error measurement circuit will be explained in detail hereinbelow with reference to FIGS. 6 to 9.

FIG. 6 is a block diagram showing a composition of a conventional bit error measurement circuit 200.

FIG. 7 is a block diagram showing a composition of a memory circuit 20 shown in FIG. 6.

The compositions of the bit error measurement circuit 200 and of the memory circuit 20 will be explained.

In FIG. 6, the bit error measurement circuit 200 comprises the memory circuit 20, an address counter 30, a switching circuit 40, an error detection circuit 50, a gate circuit 51, an error counter 60 and a clock counter 70. Further, in FIG. 6, reference numeral 1 denotes an input terminal for a signal to be measured (a test signal) 1a, 2 denotes an input terminal for a clock signal 2a, 3 denotes an input terminal for a maximum address number 3a of the address counter 30, 4 denotes an input terminal for an address counter control signal 4a, 5 denotes an input terminal for a pull-in signal 5a, 31 denotes an output terminal for an address carry-up signal 30b, 61 denotes an output terminal for a counted number 60a of errors and 71 denotes an output terminal for a counted number 70a of clock pulses.

In FIG. 7, the memory circuit 20 comprises two data input-output terminals 20X and 20Y, an address input terminal 20A, a read-write control signal input terminal 20RW and a switching signal input terminal 20SW as external terminals. Further, the memory circuit 20 comprises a memory 201 and a switching circuit 202 therein. The memory 201 has a data input-output terminal 201D, an address input terminal 201A and a read-write control signal input terminal 201RW. The switching circuit 202 has two switching terminals 202X and 202Y, a common terminal 202Z and a switching signal input terminal 202SW.

One switching terminal 202X of the switching circuit 202 is connected with the data input-output terminal 2 OX of the memory circuit 20. The other switching terminal 202Y is connected with the data input-output terminal 20Y of the memory circuit 20. The common terminal 202Z is connected with the data input-output terminal 201D. The switching signal input terminal 202SW is connected with the switching signal input terminal 20SW of the memory circuit 20. The address input terminal 201A of the memory 201 is connected with the address input terminal 20A of the memory circuit 20. The read-write control signal input terminal 201RW is connected with the read-write control signal input terminal 20RW of the memory circuit 20.

In FIG. 6, the signal 1a to be measured, which is inputted into the terminal 1 is inputted to a data input-output terminal 20X. The address number 30a outputted from an address output terminal 30OUT of the address counter 30 is inputted to the address input terminal 20A. The read-write control signal 40a outputted from an output terminal 40OUT of the switching circuit 40 is inputted to the read-write control signal input terminal 20RW. The pull-in signal 5a inputted into the terminal 5 is inputted to the switching signal input terminal 20SW.

When a logic value of the pull-in signal 5a inputted to the switching signal input terminal 20SW is "0", that is, when the pull-in operation is carried out, the switching circuit 202 of the inside of the memory circuit 20 shown in FIG. 7 connects the common terminal 202Z with the switching terminal 202X. As a result, the signal 1a to be measured, which is inputted into the data input-output terminal 20X is read and is written to the address which is indicated by the address number 30a inputted into the address input terminal 20A, by the rise of the read-write control signal 40a.

When a logic value of the pull-in signal 5a inputted to the switching signal input terminal 20SW is "1", that is, when the pull-in operation is not carried out, the switching circuit 202 of the inside of the memory circuit 20 shown in FIG. 7 connects the common terminal 202Z with the switching terminal 202Y. As a result, the data of the address which is indicated by the address number 30a inputted into the address input terminal 20A is read and is outputted from the data input-output terminal 20Y to one input terminal 50IB of the error detection circuit 50 as a reference signal 20a.

The address counter 30 comprises a clock terminal 30CLK, a maximum address number input terminal 30AM, a reset terminal 30RST, a carry-up signal output terminal 30C and an output terminal 30OUT. The clock signal 2a inputted into the terminal 2 is inputted to the clock terminal 30CLK. The maximum address number 3a inputted into the terminal 3 is inputted to the maximum address number input terminal 30AM. The address counter control signal 4a inputted into the terminal 4 is inputted to the reset terminal 30RST.

When a logic value of the address counter control signal 4a inputted to the reset terminal 30RST is "1", that is, when the count operation is carried out, the address counter 30 carries out the count-up operation by the clock signal 2a inputted to the clock terminal 30CLK and outputs the counted number from the output terminal 30OUT to the address input terminal 20A of the memory circuit 20 as an address number 30a. The counted number reaches the maximum address number 3a inputted into the maximum address number input terminal 30AM, so that the counted number is reset. At the same time, a pulse signal is outputted from the carry-up signal output terminal 30C to the terminal 31 as an address carry-up signal 30b and the count operation is carried out again.

When a logic value of the address counter control signal 4a inputted to the reset terminal 30RST is "0", that is, when the reset operation is carried out, the address counter 30 resets the counted number.

The switching circuit 40 comprises a data input terminal 40X, a data input terminal 40Y, a switching signal input terminal 40SW and an output terminal 40OUT. The clock signal 2a inputted into the terminal 2 is inputted to the data input terminal 40X. A signal having a logic value "1" (High-level signal "H") is inputted to the data input terminal 40Y. The pull-in signal 5a inputted into the terminal 5 is inputted to the switching signal input terminal 40SW.

When a logic value of the pull-in signal 5a inputted to the switching signal input terminal 40SW is "0", that is, when the pull-in operation is carried out, the output terminal 40OUT is connected with the data input terminal 40X in the switching circuit 40, so that the clock signal 2a inputted into the data input terminal 40X is outputted from the output terminal 40OUT to the read-write control signal input terminal 20RW of the memory circuit 20 as a read-write control signal 40a.

When a logic value of the pull-in signal 5a inputted to the switching signal input terminal 40SW is "1", that is, when the pull-in operation is not carried out, the output terminal 40OUT is connected with the data input terminal 40Y in the switching circuit 40, so that the signal having the logic value "1" (High-level signal "H") is outputted from the output terminal 40OUT of the switching circuit 40 to the read-write control signal input terminal 20RW of the memory circuit 20 as a read-write control signal 40a.

The error detection circuit 50 comprises a data input terminal 50IA, a data input terminal 50IB and an output terminal 50OUT. The signal 1a to be measured, which is inputted into the terminal 1 is inputted to the data input terminal 50IA. The reference signal 20a outputted from the data input-output terminal 20Y of the memory circuit 20 is inputted to the data input terminal 50IB.

The error detection circuit 50 compares the signal 1a to be measured, which is inputted into the data input terminal 50IA with the reference signal 20a inputted into the data input terminal 50IB. When it is detected that a bit of the signal 1a to be measured is different from that of the reference signal 20a, that is, when a bit error is detected, a signal having a logic value "1"0 is outputted from the output terminal 50OUT to the data input terminal 51IA of the gate circuit 51 as an error detection signal 50a. When it is detected that a bit of the signal 1a to be measured is the same as that of the reference signal 20a, that is, when a bit error is not detected, a signal having a logic value "0" is outputted from the output terminal 50OUT to the data input terminal 51IA of the gate circuit 51 as an error detection signal 50a.

The gate circuit 51 comprises a data input terminal 51IA, a data input terminal 51IB and an output terminal 51OUT. The error detection signal 50a outputted from the output terminal 50OUT of the error detection circuit 50 is inputted to the data input terminal 51IA. The clock signal 2a inputted into the terminal 2 is inputted to the data input terminal 51IB.

The gate circuit 51 outputs a signal having a logic value "1" from the output terminal 51OUT to the clock terminal 60CLK of the error counter 60 when both a logic value of the error detection signal 50a inputted into the data input terminal 51IA and that of the clock signal 2a inputted into the data input terminal 51IB are "1". That is, the result of AND operation of the error detection signal 50a and the clock signal 2a is outputted from the output terminal 51OUT to the clock terminal 60CLK of the error counter 60 as an error detection pulse signal 51a.

The error counter 60 comprises a clock terminal 60CLK, a reset terminal 60RST and an output terminal 60OUT. The error detection pulse signal 51a outputted from the output terminal 51OUT of the gate circuit 51 is inputted to the clock terminal 60CLK. The pull-in signal 5a inputted into the terminal 5 is inputted to the reset terminal 60RST.

When a logic value of the pull-in signal 5a inputted to the reset terminal 60RST is "0", that is, when the pull-in operation is carried out, the error counter 60 resets the counted number of the bit errors.

When a logic value of the pull-in signal 5a inputted to the reset terminal 60RST is "1", that is, when the pull-in operation is not carried out, the error counter 60 counts up the bit errors by inputting the error detection pulse signal 51a into the clock terminal 60CLK and outputs the counted number from the terminal 61 to the outside of the bit error measurement circuit as a counted number 60a of errors.

The clock counter 70 comprises a clock terminal 70CLK, a reset terminal 70CLK and an output terminal 70OUT. The clock signal 2a inputted into the terminal 2 is inputted to the clock terminal 70CLK. The pull-in signal 5a inputted into the terminal 5 is inputted to the reset terminal 70RST.

When a logic value of the pull-in signal 5a inputted to the reset terminal 70RST is "0", that is, when the pull-in operation is carried out, the clock counter 70 resets the counted number of clock pulses.

When a logic value of the pull-in signal 5a inputted to the reset terminal 70RST is "1", that is, when the pull-in operation is not carried out, the clock counter 70 counts up the pulses by inputting the clock signal 2a to the clock terminal 70CLK and outputs the counted number from the terminal 71 to the outside of the bit error measurement circuit as a counted number 70a of clock pulses.

The operation of the bit error measurement 200 shown in FIG. 6 will be explained with reference to a time chart shown in FIG. 8.

In FIG. 8, the reference numeral 2a denotes a waveform illustration showing the clock signal.

The reference numeral 1a denotes a waveform illustration showing the signal to be measured. In this case, the length of one period is 6 bits. The marks A to F and the periodic number denote each bit of the signal to be measured. For example, each bit of the first period is denoted by the marks D1, E1, F1, A1, B1 and C1, each bit of the second period is denoted by the marks D2, E2, F2, A2, B2 and C2, and the like. As shown in FIG. 8, the period is from the first bit written in the memory circuit 20 to the last bit done. Therefore, the period is not necessarily coincident with a period which is determined on the basis of the first bit and the last bit of the pattern set by a transmission device.

A line attached to the upper position of the mark indicates an erroneous bit. For example, because a line is attached to the upper position of the mark A3, the bit A3 is an erroneous bit.

The reference numeral 3a denotes a signal setting the maximum address number of the address counter 30. As shown in FIG. 8, because the length of one period of the signal to be measured is 6 bits, the maximum address number 3a is "6".

The reference numeral 4a denotes a waveform illustration showing the address counter control signal. As shown in FIG. 8, when the logic value of the address counter control circuit 4a is "0", the address counter 30 is reset. The reference numeral 30a denotes a waveform illustration showing the address number outputted by the address counter 30, 30b denotes a waveform illustration showing the address carry-up signal outputted by the address counter 30.

The reference numeral 5a denotes a waveform illustration showing the pull-in signal. As shown in FIG. 8, when the logic value of the pull-in signal 5a is "0", the pull-in operation is carried out. The error counter 60 and the clock counter 70 are operated by the pull-in signal 5a. When the logic value of the pull-in signal 5a is "1", that is, when the pull-in operation is not carried out, the error counter 60 and the clock counter 70 carry out the count operation. When the logic value of the pull-in signal 5a is "0", that is, when the pull-in operation is carried out, each number counted by the two counters is reset and each count operation is stopped.

The reference numeral 40a denotes a waveform illustration showing the read-write control signal of the memory 201, 20a denotes a waveform illustration showing the error detection reference signal outputted by the memory circuit 20, 50a denotes a waveform illustration showing the error detection signal, 51a denotes a waveform illustration showing the error detection pulse signal, 60a denotes a waveform illustration showing the counted number of errors and 70a denotes a waveform illustration showing the counted number of clock pulses.

At the time t1, a signal having a logic value "0" is inputted to the reset terminal 30RST of the address counter 30 by converting the logic value "1" of the address counter control signal 4a inputted to the terminal 4 into the logic value "0", so that the address number 30a of the address counter 30 is reset. At the same time that the reset operation is carried out by the address counter control signal 4a, the logic value "1" of the pull-in signal 5a inputted to the terminal 5 is converted into the logic value "0", that is, the pull-in operation of the signal 1a to be measured is carried out.

A signal having a logic value "0" is inputted to the switching signal input terminal 40SW of the switching circuit 40 by the logic value "0" of the pull-in signal 5a, so that the output terminal 40OUT of the switching circuit 40 is connected with the data input terminal 40X in the switching circuit 40. At the same time, the clock signal 2a inputted into the data input terminal 40X is outputted to the read-write control signal input terminal 20RW of the memory circuit 20 as a read-write control signal 40a.

A signal having a logic value "0" is inputted to the switching signal input terminal 20SW of the memory circuit 20 by the logic value "0" of the pull-in signal 5a, so that the switching circuit 202 of the inside of the memory circuit 20 connects the switching terminal 202X with the common terminal 202Z. At the same time, the signal 1a to be measured, which is inputted into the data input-output terminal 20X is inputted to the data input-output terminal 201D of the memory 201.

A signal having a logic value "0" is inputted to the reset terminal 60RST of the error counter 60 and to the reset terminal 70RST of the clock counter 70 by the logic value "0" of the pull-in signal 5a, so that the counted number 60a of errors and the counted number 70a of clock pulses are reset and each count operation is stopped.

At the time t2, a signal having a logic value "1" is inputted to the reset terminal 30RST of the address counter 30 by converting the logic value "0" of the address counter control signal 4a into the logic value "1", and the reset operation of the address counter 30 is canceled, so that the address counter 30 carries out the count-up operation by inputting the clock signal 2a into the clock terminal 30CLK and outputs the address number 30a counted by the address counter 30 from the output terminal 30OUT to the address input terminal 20A of the memory circuit 20.

Because of the rise of the read-write control signal 40a inputted to the read-write control signal input terminal 20RW of the memory circuit 20 at the time t2, the memory circuit 20 writes the bit D1 of the signal 1a to be measured, which is inputted to the data input-output terminal 20X at the time t2 to the address "1" of the memory 201, which is indicated by the address number 30a inputted into the address input terminal 20A by the address counter 30.

Subsequently, before the address number 30a counted by the address counter 30 reaches the maximum address number 3a (=6) and the address counter 30 carries up, the bits E1, F1, A1 . . . of the signal 1a to be measured are read and are written in the memory 201.

At the time t3, the address counter 30 counts up to the address number defined by the maximum address number 3a, so that the address carry-up pulse P1 is outputted from the carry-up signal output terminal 30C as an address carry-up signal 30b. At the same time that the address carry-up pulse P1 rises, a logic value of the pull-in signal 5a becomes "1".

A signal having a logic value "1" is inputted to the switching signal input terminal 40SW of the switching circuit 40 by the logic value "1" of the pull-in signal 5a, so that the output terminal 40OUT of the switching circuit 40 is connected with the data input terminal 40Y in the switching circuit 40. At the same time, a signal having a logic value "1" (High-level signal "H") inputted into the data input terminal 40Y is outputted from the output terminal 40OUT to the read-write control signal input terminal 20RW of the memory circuit 20 as a read-write control signal 40a. Because a signal fixed at a logic value "1" is inputted to the read-write control signal input terminal 20RW, the memory circuit 20 is fixed in the mode that the data memorized in the memory 201 are read out.

A signal having a logic value "1" is inputted to the switching signal input terminal 20SW of the switching circuit 20 by the logic value "1" of the pull-in signal 5a, so that the switching circuit 202 of the inside of the memory circuit 20 connects the switching terminal 202Y with the common terminal 202Z. At the same time, the memory circuit 20 reads the data written to the address of the memory 201, which is indicated by the address number 30a inputted to the address input terminal 20A at the time t3 by the address counter 30, and outputs the data from the data input-output terminal 20Y.

Subsequently, the memory circuit 20 reads the data written in the memory 202 similarly to the above-described method. As shown in FIG. 8, the bits D1, E1, F1, A1, B1 and C1 are written in the memory circuit 20 from the time t2 to the time t3, and are read periodically and repeatedly.

A signal having a logic value "1" is inputted to the reset terminal 60RST of the error counter 60 and to the reset terminal 70RST of the clock counter 70 by the logic value "1" of the pull-in signal 5a, so that the reset operations of the error counter 60 and the clock counter 70 are canceled and each counter carries out the count-up operation. Subsequently, the clock counter 70 counts the bits measured for a bit error indirectly as a counted number 70a of clock pulses by counting the pulses of the clock signal 2a.

At the time t4, the erroneous bit E2 of the signal 1a to be measured is inputted to the data input terminal 50IA of the error detection circuit 50. Similarly, the correct bit E1 of the reference signal 20a is inputted from the memory circuit 20 to the data input terminal 50IB of the error detection circuit 50. As a result, the error detection circuit 50 outputs an error detection pulse P2 from the output terminal 50OUT as an error detection signal 50a. The error detection pulse P2 is inputted to the data input terminal 51IA of the gate circuit 51 as an error detection signal 50a, so that the result of AND operation of the error detection signal 50a and the clock signal 2a inputted into the data input terminal 51IB is outputted from the output terminal 51OUT to the clock terminal 60CLK of the error counter 60 as an error detection pulse signal 51a. The error detection pulse signal 51a is the same waveform as the clock signal 2a while the logic value of the error detection signal 50a is "1".

The error counter 60 counts up the counted number 60a of errors by inputting the error detection pulse signal 51a from the gate circuit 51 to the clock terminal 60CLK.

Subsequently, by the similar operation, the error counter 60 counts the erroneous bits. The bit error rate is calculated by dividing the counted number of errors 60 counted by the error counter 60 by the counted number 70a of clock pulses.

The conventional bit error measurement circuit 200 ensures that the pull-in operation is carried out for transmission time of one periodic data and the signal to be measured is synchronized with the reference signal. However, because the data fed into the memory 201 as a reference signal 20a is not measured for a bit error, there is a problem that a bit error measurement cannot be carried out precisely if the reference signal 20a has a bit error.

FIG. 9 is a time chart showing the example of the above-described problem. In FIG. 9, because the reference numerals denoting the signals are the same as those of FIG. 8, the explanations of the numerals are omitted. Further, in FIG. 9, the positions of the bit errors inputted after the second period of the signal 1a to be measured are the same as those shown in FIG. 8. However, FIGS. 8 and 9 are different in the point whether the bit A1 of the first period is erroneous or not.

At the time t3, because the memory circuit 20 writes the erroneous bit A1 as a reference signal, the reference signal 20a outputted from the data input-output terminal 20Y of the memory circuit 20 to the error detection circuit 50 includes the erroneous bit A1.

At the time t6, however the bit A2 of the signal 1a to be measured, which is inputted into the data input terminal 50IA of the error detection circuit 50 is a correct bit, an error detection pulse P3 is outputted from the output terminal 50OUT as an error detection signal 50a because of the erroneous bit A1 of the reference signal 20a inputted into the data input terminal 50IB.

On the other hand, at the time t7, however the erroneous bit A3 of the signal 1a to be measured is inputted into the data input terminal 50IA of the error detection circuit 50, because of the erroneous bit A1 of the reference signal 20a inputted into the data input terminal 50IB, the two signals inputted into the data input terminal 50IA and the data input terminal 50IB are same. As a result, the error detection circuit 50 does not generate the error detection pulse.

As described above, in the case that the data used as a reference signal has an erroneous bit, the bit error measurement cannot be carried out precisely. In particular, because the bit error which necessarily occurs at the same bit of each period cannot be detected, there is a problem that a serious defect of measuring objects, such as a logical miss, cannot be detected.

SUMMARY OF THE INVENTION

The present invention was developed in order to solve the above-mentioned problems. An object of the present invention is to provide a bit error measurement circuit comprising a means for detecting a bit error of data fetched from a signal to be measured and written in a memory, and a means for correcting the bit error, if any.

In accordance with one aspect of the present invention, the bit error measurement circuit comprises: a memory circuit for memorizing one period data of a signal to be measured as a reference signal, an error detection circuit for detecting erroneous bits of the signal to be measured, an error counter for counting the erroneous bits detected by the error detection circuit, and a plurality of terminals for inputting a control signal to control the memory circuit from outside of the bit error measurement circuit; wherein the reference signal memorized in the memory circuit is inspected outside the bit error measurement circuit, and the erroneous bits are corrected on the basis of the control signal fed from the outside of bit error measurement circuit, when there are erroneous bits.

In such a bit error measurement circuit, the memory circuit memorizes one period data of the signal to be measured as a reference signal and outputs the memorized reference signal to the error detection circuit. The error detection circuit compares the reference signal inputted to the memory circuit with the signal to be measured and outputs the error detection signal to the error counter when the erroneous bit is detected. The error counter counts the bit errors by inputting the error detection signal from the error detection circuit. By the plurality of the terminals for inputting the control signal to control from the outside of the memory circuit, the control signal to fetch the reference signal memorized in the memory circuit or the like, is inputted into the bit error measurement circuit, so that it is inspected outside the bit error measurement circuit whether the reference signal has an erroneous bit or not. When the reference signal has an erroneous bit, the erroneous bit is corrected and then the correct reference signal is memorized in the memory circuit.

Therefore, even if the reference signal generated by memorizing one period data of the signal to be measured in the memory circuit has an erroneous bit, the erroneous bit can be corrected, so that the bit error measurement can be carried out precisely.

The memory circuit may be regard as a first memory circuit, and the bit error measurement circuit may comprise: a second memory circuit for memorizing data which is the same as the data memorized in the first memory circuit, as the reference signal; and a selection circuit for selecting any one of the reference signal outputted from the first memory circuit and that outputted from the second memory circuit, and for outputting the reference signal to the error detection circuit; wherein while the reference signal memorized in the first memory circuit is inspected and corrected, the selection circuit selects the reference signal memorized in the second memory circuit and outputs it to the error detection circuit, and the reference signal memorized in the second memory circuit is used for detecting the erroneous bits, so that the signal to be measured, which is measured for a bit error, and the reference signal memorized in the first memory circuit is corrected, simultaneously.

The bit error measurement circuit may comprise a third memory circuit for memorizing a result of detecting the erroneous bits by using the reference signal memorized in the second memory circuit while the reference signal memorized in the first memory circuit is corrected; a plurality of terminals for inputting a control signal to control the third memory circuit from the outside of the bit error measurement circuit; and a period counter for counting the number of periods of the signal which was measured for a bit error while the reference signal memorized in the first memory circuit is corrected; wherein a measured result for a bit error while the reference signal memorized in the first memory circuit is corrected, is revised by using memorized data in the third memory circuit, a counted number of periods in the period counter, a counted number of errors in the error counter and a corrected result of the reference signal memorized in the first memory circuit.

BRIEF DESCRIPTION OF THE DRAWINGS

The present invention will become more fully understood from the detailed description given hereinbelow and the accompanying drawings which are given by way of illustration only, and thus do not limit the present invention, and wherein.

DESCRIPTION OF THE PREFERRED EMBODIMENT

The embodiment of the bit error measurement circuit which is related to the present invention will be explained in detail hereinbelow with reference to FIGS. 1 to 3.

A composition of a bit error measurement circuit will be explained with reference to FIG. 1.

Figure 1:
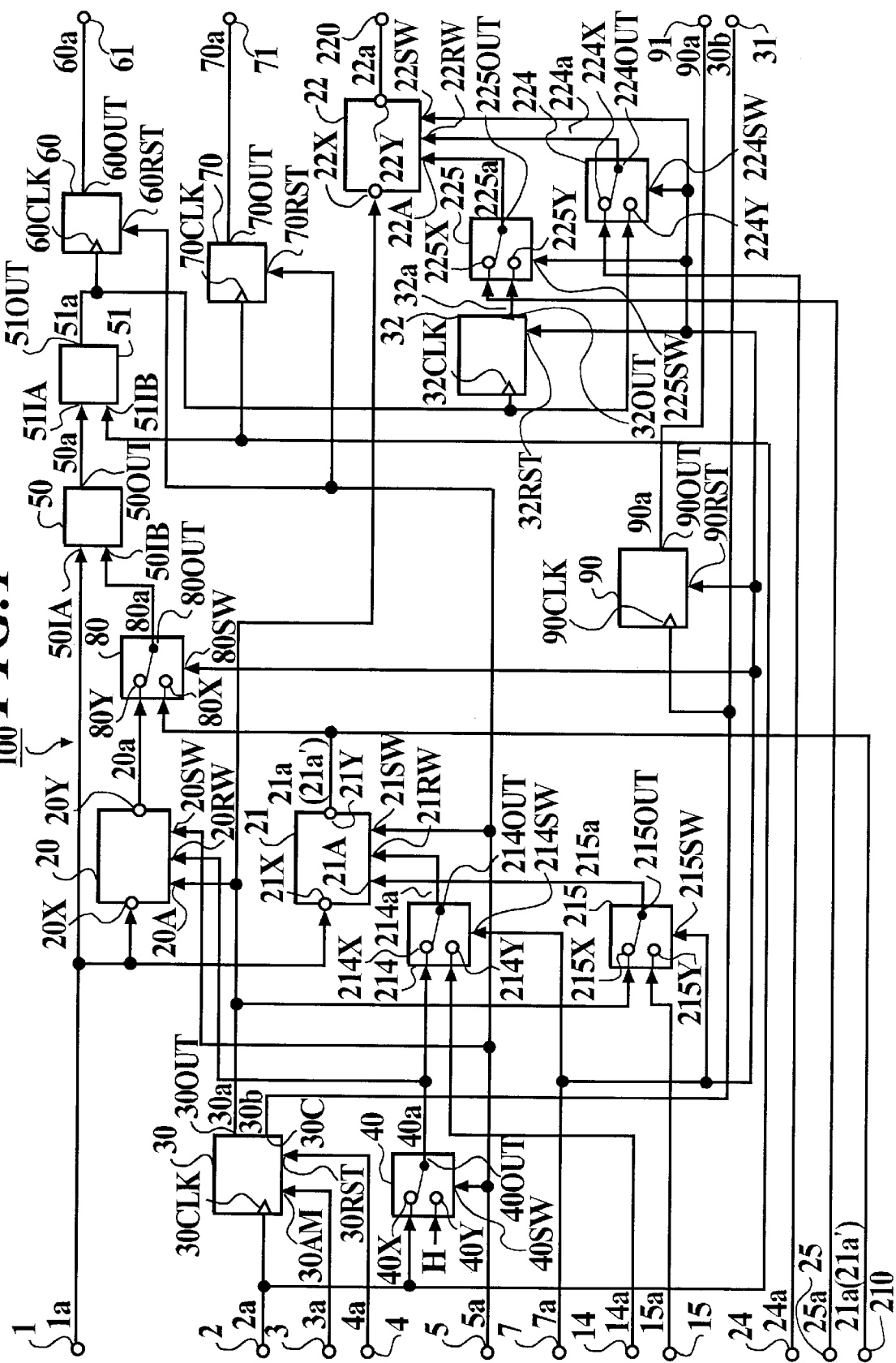
FIG. 1 is a block diagram showing the composition of a bit error measurement circuit to which the present invention applies.

FIG. 1 is a block diagram showing a composition of a bit error measurement circuit 100 to which the present invention applies.

In FIG. 1, the bit error measurement circuit 100 comprises memory circuits 20, 21 and 22, address counters 30 and 32, switching circuits 40, 80, 214, 215, 224 and 225, an error detection circuit 50, a gate circuit 51, an error counter 60, a clock counter 70 and a period counter 90.

Further, in FIG. 1, reference numeral 1 denotes an input terminal for a signal to be measured (a test signal) 1a, 2 denotes an input terminal for a clock signal 2a, 3 denotes an input terminal for a maximum address number 3a of an address counter 30, 4 denotes an input terminal for an address counter control signal 4a, 5 denotes an input terminal for a pull-in signal 5a, 7 denotes an input terminal for a notice of correction signal 7a, 14 denotes an input terminal for a read-write control signal 14a inputted from the outside of the bit error measurement 100 to a memory circuit 21, 15 denotes an input terminal for an address number 15a inputted from the outside of the bit error measurement 100 to a memory circuit 21, 24 denotes an input terminal for a read-write control signal 24a inputted from the outside of the bit error measurement 100 to a memory circuit 22 and 25 denotes an input terminal for an address number 25a inputted from the outside of the bit error measurement 100 to a memory circuit 22.

The reference numeral 31 denotes an output terminal for an address carry-up signal 30b, 61 denotes an output terminal for a counted number 60a of errors, 71 denotes an output terminal for a counted number 70a of clock pulses, 91 denotes an output terminal for a counted number 90a of periods and 220 denotes an output terminal for a memorized data 22a of the memory circuit 22.

The reference numeral 210 denotes an input-output terminal for an error detection reference signal 21a which is an input-output signal of the memory circuit 21.

Figure 6:
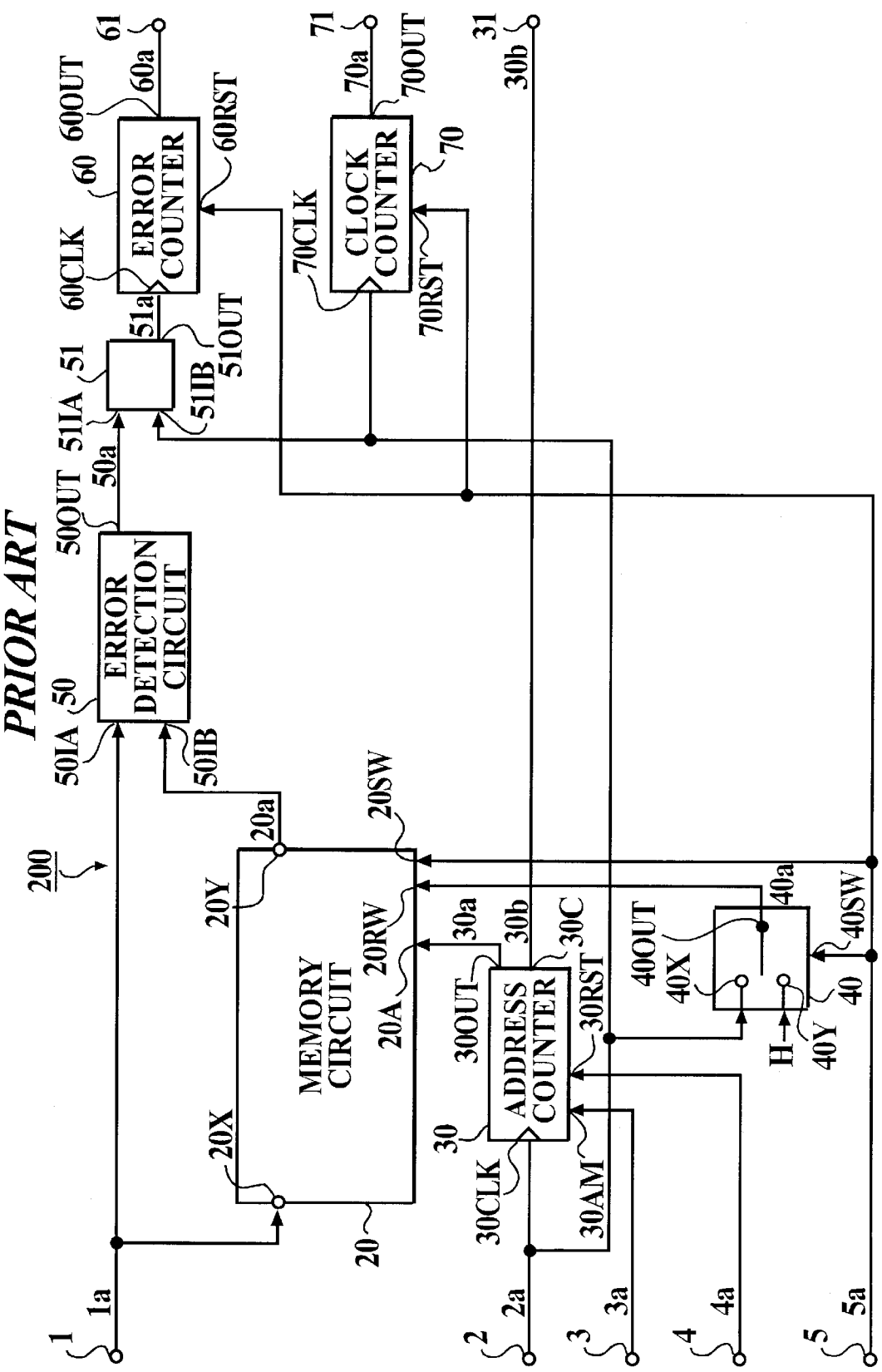
FIG. 6 is a block diagram showing the composition of a conventional bit error measurement circuit.

In the above-described elements, the memory circuit 20, the address counter 30, the switching circuit 40, the error detection circuit 50, the gate circuit 51, the error counter 60 and the clock counter 70 are the same elements as those of the conventional example shown in FIG. 6. The composition of the memory circuits 20, 21 and 22 is the same as that of the conventional memory circuit shown in FIG. 7.

In FIG. 1, the address counter 30 comprises a clock terminal 30CLK, a maximum address number input terminal 30AM, a reset terminal 30RST, a carry-up signal output terminal 30C and an output terminal 30OUT. The clock signal 2a inputted into the terminal 2 is inputted to the clock terminal 30CLK. The maximum address number 3a inputted into the terminal 3 is inputted to the maximum address number input terminal 30AM. The address counter control signal 4a inputted into the terminal 4 is inputted to the reset terminal 30RST.

When the logic value of the address counter control signal 4a inputted to the reset terminal 30RST is "1", that is, when the count operation is carried out, the address counter 30 carries out the count-up operation by inputting the clock signal 2a to the clock terminal 30CLK and outputs the counted number from the output terminal 30OUT to the address input terminal 20A of the memory circuit 20, to the data input-output terminal 22X of the memory circuit 22 and to the data input terminal 215X of the switching circuit 215 as an address number 30a. The counted number reaches the maximum address number 3a inputted into the maximum address number input terminal 30AM, so that the counted number is reset. At the same time, a pulse signal is outputted from the carry-up signal output terminal 30C to the clock signal input terminal 90CLK of the period counter 90 and to the terminal 31 as an address carry-up signal 30b, and the count operation is carried out again.

When a logic value of the address counter control signal 4a inputted to the reset terminal 30RST is "0", that is, when the reset operation is carried out, the address counter 30 resets the counted number.

That is, the address counter 30 inputs the number which is the same as the number of the bits of one periodic signal 1a to be measured to the maximum address number input terminal 30AM, so that the address of the memory circuit 20 is assigned periodically and repeatedly.

The switching circuit 40 comprises two data input terminals 40X and 40Y, a switching signal input terminal 40SW and an output terminal 40OUT. The clock signal 2a inputted into the terminal 2 is inputted to the data input terminal 40X. A signal having a logic value "1" (High-level signal "H") is inputted to the data input terminal 40Y. The pull-in signal 5a inputted into the terminal 5 is inputted to the switching signal input terminal 40SW.

When a logic value of the pull-in signal 5a inputted to the switching signal input terminal 40SW is "0", that is, when the pull-in operation is carried out, the output terminal 40OUT is connected with the data input terminal 40X in the switching circuit 40, so that the clock signal 2a inputted into the data input terminal 40X is outputted from the output terminal 40OUT to the read-write control signal input terminal 20RW of the memory circuit 20 and to the data input terminal 214X of the switching circuit 214 as a read-write control signal 40a.

When a logic value of the pull-in signal 5a inputted to the switching signal input terminal 40SW is "1", that is, when the pull-in operation is not carried out, the output terminal 40OUT is connected with the data input terminal 40Y in the switching circuit 40, so that the signal fixed at the logic value "1" (High-level signal "H") is outputted from the output terminal 40OUT of the switching circuit 40 to the read-write control signal input terminal 20RW of the memory circuit 20 and to the data input terminal 214X of the switching circuit 214 as a read-write control signal 40a.

That is, during the pull-in operation, the switching circuit 40 directs the memory circuits 20 and 21 to write the data at the time that the clock signal 2a rises. On the other hand, after the pull-in operation, the switching circuit 40 outputs the signal having the logic value "1" to the memory circuits 20 and 21 in order to fix in the mode that the data memorized in the memory circuits 20 and 21 are read.

The memory circuit 20 comprises two data input-output terminals 20X and 20Y, an address input terminal 20A, a read-write control signal input terminal 20RW and a switching signal input terminal 20SW. The signal 1a to be measured, which is inputted into the terminal 1 is inputted to the data input-output terminal 20X. The address number 30a outputted from the address output terminal 30OUT of the address counter 30 is inputted to the address input terminal 20A. The read-write control signal 40a outputted from the output terminal 40OUT of the switching circuit 40 is inputted to the read-write control signal input terminal 20RW. The pull-in signal 5a inputted into the terminal 5 is inputted to the switching signal input terminal 20SW.

Figure 7:
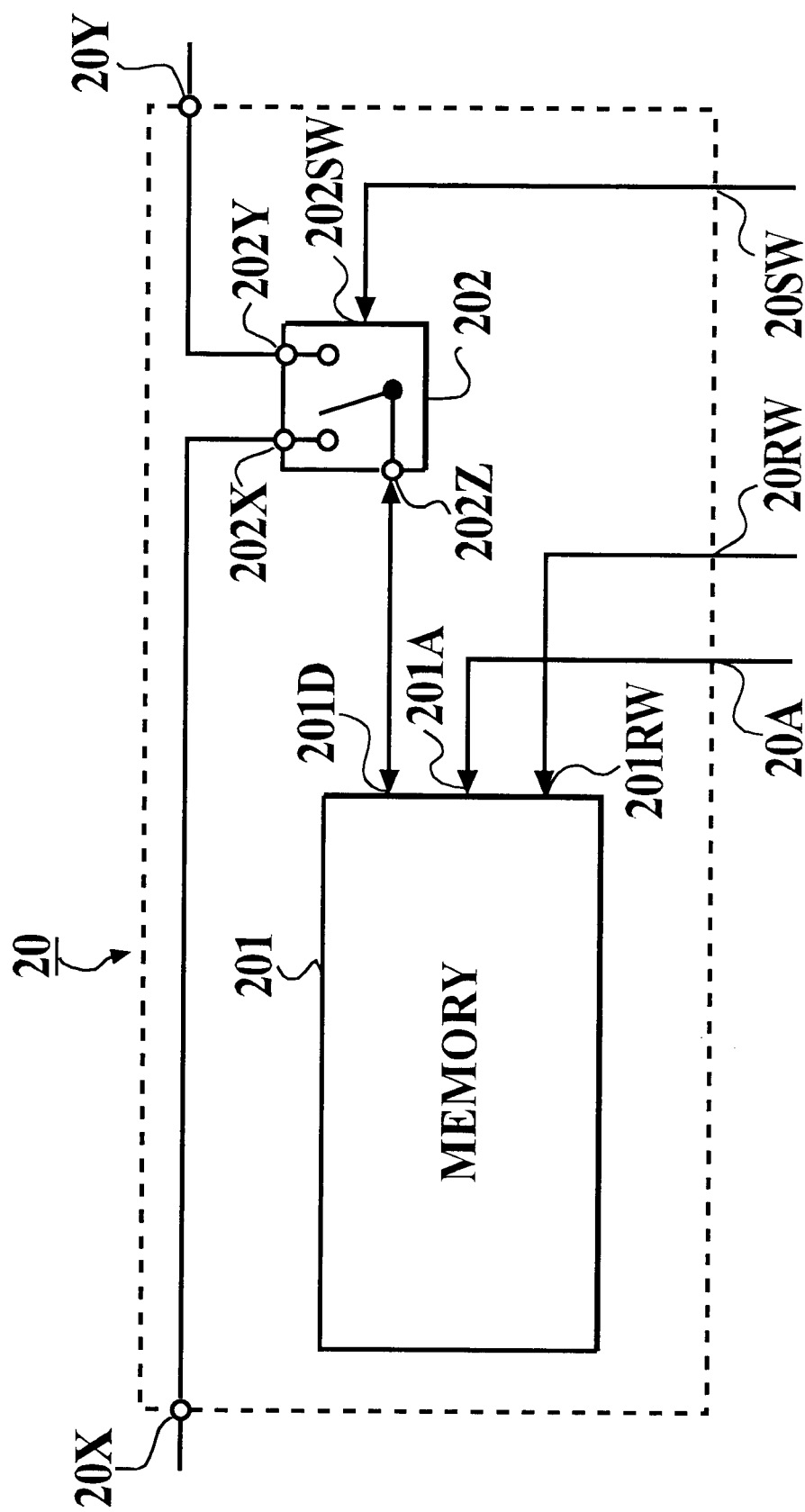
FIG. 7 is a block diagram showing the composition of a memory circuit shown in FIG. 6.
Figure 8:
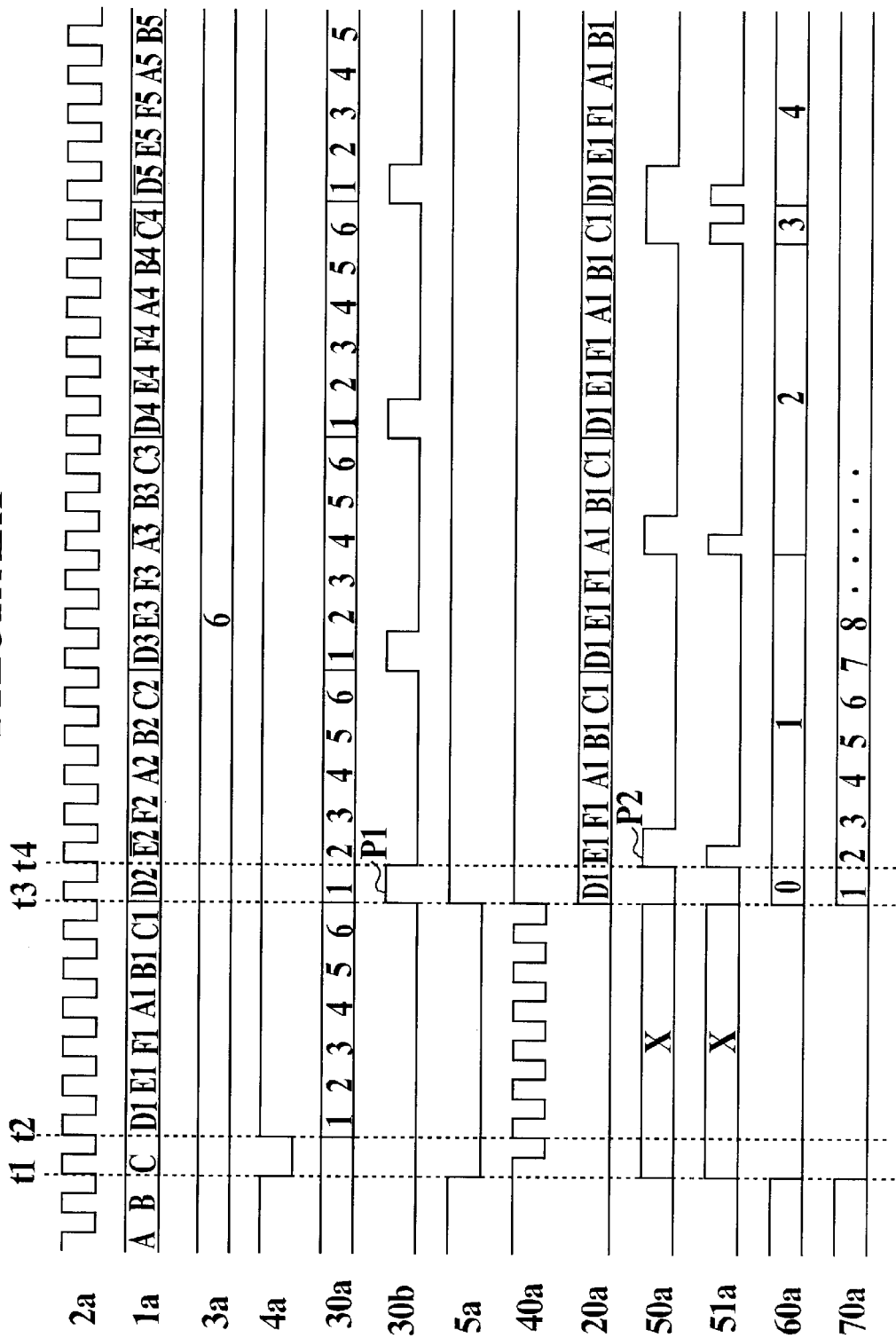
FIG. 8 is a time chart to explain the operations of the bit error measurement circuit shown in FIG. 6.
Figure 9:
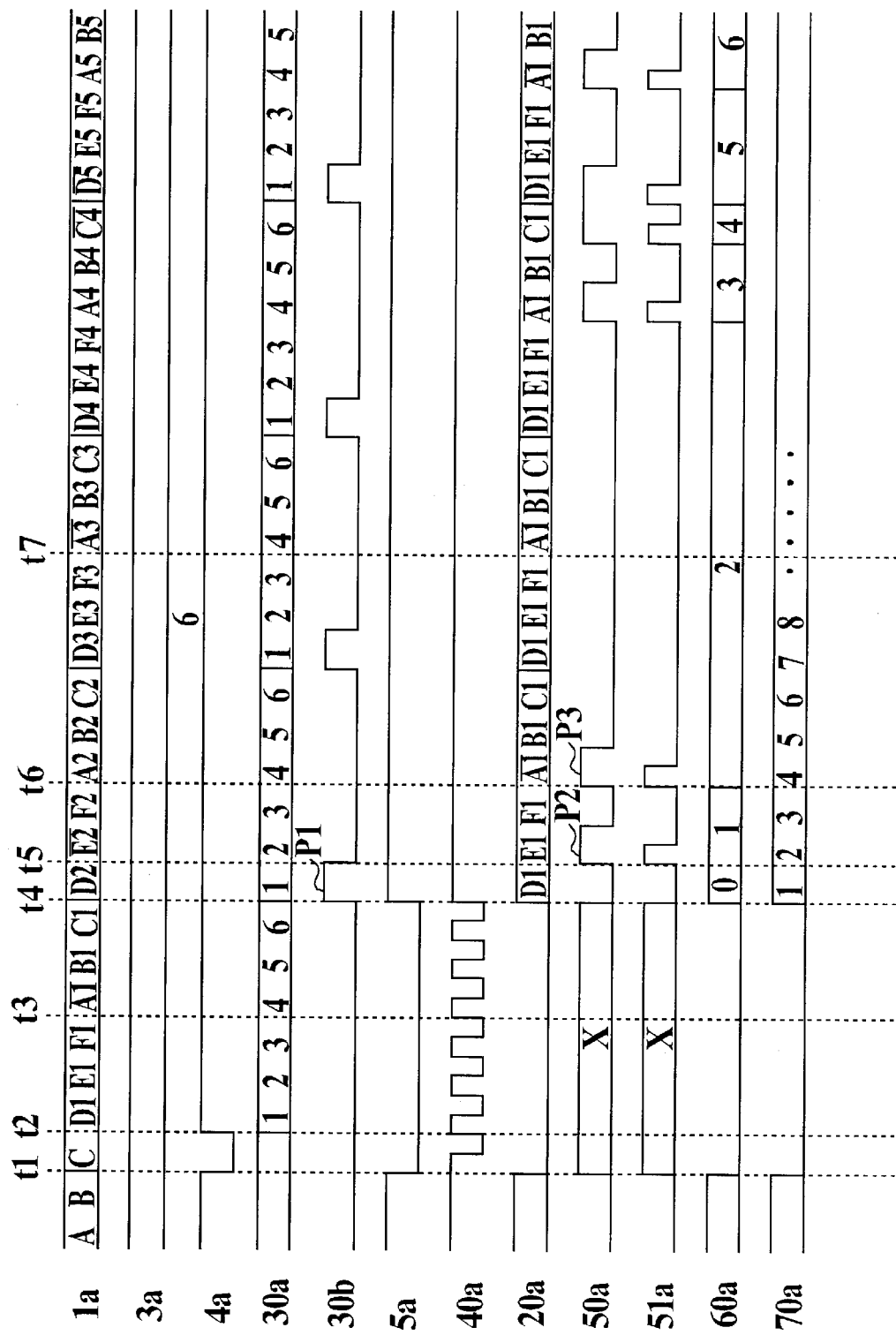
FIG. 9 is a time chart to explain the problem of the operations of the bit error measurement circuit shown in FIG. 6.

When a logic value of the pull-in signal 5a inputted to the switching signal input terminal 20SW is "0", that is, when the pull-in operation is carried out, the switching circuit 202 of the inside of the memory circuit 20 shown in FIG. 7 connects the common terminal 202Z with the switching terminal 202X. As a result, the memory circuit 20 reads the signal 1a to be measured, which is inputted into the data input-output terminal 20X, and writes the signal 1a to be measured to the address which is indicated by the address number 30a inputted to the address input terminal 20A, by the rise of the read-write control signal 40a.

When a logic value of the pull-in signal 5a inputted to the switching signal input terminal 20SW is "1", that is, when the pull-in operation is not carried out, the switching circuit 202 of the inside of the memory circuit 20 shown in FIG. 7 connects the common terminal 202Z with the switching terminal 202Y. As a result, the memory circuit 20 reads the data of the address which is indicated by the address number 30a inputted to the address input terminal 20A, and outputs the signal to be measured, which is written in the memory 201 from the data input-output terminal 20Y to the data input terminal 80Y of the error switching circuit 80 as a reference signal 20a.

That is, during the pull-in operation, the memory circuit 20 generates the error detection reference signal by memorizing one period of the signal 1a to be measured in the memory. On the other hand, after the pull-in operation, the memory circuit 20 outputs the error detection reference signal 20a as an error detection reference signal until the finish of the correcting operation.

The switching circuit 214 comprises two data input terminals 214X and 214Y, a switching signal input terminal 214SW and an output terminal 214OUT. The read-write control signal 40a outputted from the output terminal 40OUT of the switching circuit 40 is inputted to the data input terminal 214X. The read-write control signal 14a inputted into the terminal 14 is inputted to the data input terminal 214Y. The notice of correction signal 7a inputted into the terminal 7 is inputted to the switching signal input terminal 214SW.

When a logic value of the pull-in signal 7a inputted to the switching signal input terminal 214SW is "0", that is, when the correcting operation is not carried out, the output terminal 214OUT is connected with the data input terminal 214X in the switching circuit 214, so that the read-write control signal 40a inputted into the data input terminal 214X is outputted from the output terminal 214OUT to the read-write control signal input terminal 21RW of the memory circuit 21 as a read-write control signal 214a.

When a logic value of the pull-in signal 7a inputted to the switching signal input terminal 214SW is "1", that is, when the correcting operation is carried out, the output terminal 214OUT is connected with the data input terminal 214Y in the switching circuit 214, so that the read-write control signal 14a inputted into the terminal 14 and thereafter inputted into the terminal 214 is outputted from the output terminal 214OUT to the read-write control signal input terminal 21RW of the memory circuit 21 as a read-write control signal 214a.

That is, during the correcting operation, the switching circuit 214 outputs the read-write control signal 14a fed from the outside of the bit error detection circuit to the memory circuit 21, so that the memory circuit 21 can be controlled by the control from the outside of the bit error detection circuit. On the other hand, after the correcting operation, the switching circuit 40 is connected with the memory circuit 21, so that a signal having a logic value "0" (High-level signal "H") is outputted to the memory circuit 21 in order to fix in the mode that the data memorized in the memory circuit 21 are read.

The switching circuit 215 comprises two data input terminals 215X and 215Y, a switching signal input terminal 215SW and an output terminal 215OUT. The address number 30a outputted from the output terminal 30OUT of the address counter 30 is inputted to the data input terminal 215X. The address number 15a inputted into the terminal 15 is inputted to the data input terminal 215Y. The pull-in signal 7a inputted into the terminal 7 is inputted to the switching signal input terminal 215SW.

When a logic value of the pull-in signal 7a inputted to the switching signal input terminal 215SW is "0", that is, when the correcting operation is not carried out, the output terminal 215OUT is connected with the data input terminal 215X in the switching circuit 215, so that the address number 30a inputted into the data input terminal 215X is outputted from the output terminal 215OUT to the address input terminal 21A of the memory circuit 21 as an address number 215a.

When a logic value of the pull-in signal 7a inputted to the switching signal input terminal 215SW is "1", that is, when the correcting operation is carried out, the output terminal 215OUT is connected with the data input terminal 215Y in the switching circuit 215, so that the address number 15a inputted into the terminal 15 and thereafter inputted into the terminal 215Y is outputted from the output terminal 215OUT to the address input terminal 21A of the memory circuit 21 as an address number 215a.

That is, during the correcting operation, the switching circuit 215 outputs the address number 15a fed from the outside of the bit error detection circuit to the memory circuit 21, so that the memory circuit 21 can be controlled by the control from the outside of the bit error detection circuit. On the other hand, after the correcting operation, the address counter 30 is connected with the memory circuit 21, so that the address counter 30 assigns the address of the memory circuit 21 periodically and repeatedly.

The memory circuit 21 comprises two data input-output terminals 21X and 21Y, an address input terminal 21A, a read-write control signal input terminal 21RW and a switching signal input terminal 21SW. The signal 1a to be measured, which is inputted into the terminal 1 is inputted to the data input-output terminal 21X. The address number 215a outputted from the output terminal 215OUT of the address counter 215 is inputted to the address input terminal 21A. The read-write control signal 214a outputted from the output terminal 214OUT of the switching circuit 214 is inputted to the read-write control signal input terminal 21RW. The pull-in signal 5a inputted into the terminal 5 is inputted to the switching signal input terminal 21SW.

When a logic value of the pull-in signal 5a inputted to the switching signal input terminal 21SW is "0", that is, when the pull-in operation is carried out, similarly to FIG. 7, the switching circuit 202 of the inside of the memory circuit 21 connects the common terminal 202Z with the switching terminal 202X. As a result, the memory circuit 21 reads the signal 1a to be measured, which is inputted into the data input-output terminal 21X, and writes the signal 1a to be measured to the address which is indicated by the address number 215a inputted to the address input terminal 21A, by the rise of the read-write control signal 214a.

When a logic value of the pull-in signal 5a inputted to the switching signal input terminal 21SW is "1", that is, when the pull-in operation is not carried out, similarly to FIG. 7, the switching circuit 202 of the inside of the memory circuit 21 connects the common terminal 202Z with the switching terminal 202Y. As a result, the memory circuit 21 outputs the data of the address which is indicated by the address number 215a inputted into the address input terminal 21A, from the data input-output terminal 21Y to the data input terminal 80X of the error switching circuit 80 and to the terminal 210 as an error detection switching reference signal 21a. In the other case, the memory circuit 21 reads the corrected error detection reference signal 21a' inputted into the terminal 210 and thereafter inputted into the data input-output terminal 21Y, and writes the corrected error detection reference signal 21a' to the address which is indicated by the address number 215a inputted into the address input terminal 21A, by the rise of the read-write control signal 214a.

That is, during the pull-in operation, the memory circuit 21 generates the error detection reference signal by memorizing one period of the signal 1a to be measured in the memory. On the other hand, after the pull-in operation, the error detection reference signal memorized in the memory is corrected by the control from the outside of the bit error measurement circuit and the corrected error detection reference signal is memorized in the memory again until the finish of the correcting operation. After the correcting operation, the error detection reference signal 21a' is outputted to the switching circuit 80 as an error detection reference signal.

The switching circuit 80 comprises two data input terminals 80X and 80Y, a switching signal input terminal 80SW and an output terminal 80OUT. The error detection reference signal 21a outputted from the output terminal 21Y of the memory circuit 21 is inputted to the data input terminal 80X. The error detection reference signal 20a outputted from the data input-output terminal 20Y of the memory circuit 20 is inputted to the data input terminal 80Y. The notice of correction signal 7a inputted into the terminal 7 is inputted to the switching signal input terminal 80SW.

When a logic value of the pull-in signal 7a inputted to the switching signal input terminal 80SW is "0", that is, when the correcting operation is not carried out, the output terminal 80OUT is connected with the data input terminal 80X in the switching circuit 80, so that the error detection reference signal 21a inputted into the data input terminal 80X is outputted from the output terminal 80OUT to the data input terminal 50IB of the error detection circuit 50 as a reference signal 80a.

When a logic value of the pull-in signal 7a inputted to the switching signal input terminal 80SW is "1", that is, when the correcting operation is carried out, the output terminal 80OUT is connected with the data input terminal 80Y in the switching circuit 80, so that the error detection reference signal 20a inputted into the terminal 80Y is outputted from the output terminal 80OUT to the data input terminal 50IB of the error detection circuit 50 as a reference signal 80a.

That is, during the correcting operation, the switching circuit 80 outputs the error detection reference signal 20a outputted from the memory circuit 20 as a reference signal. On the other hand, after the correcting operation, the switching circuit 80 outputs the error detection reference signal 21a outputted from the memory circuit 21 as a reference signal.

The error detection circuit 50 comprises two data input terminals 50IA and 50IB, and an output terminal 50OUT. The signal 1a to be measured, which is inputted into the terminal 1 is inputted to the data input terminal 50IA. The reference signal 80a outputted from the output terminal 80OUT of the switching circuit 80 is inputted to the data input terminal 50IB.

That is, the error detection circuit 50 compares the signal 1a to be measured, which is inputted into the data input terminal 50IA with the reference signal 80a inputted into the data input terminal 50IB. When it is detected that the bit of the signal 1a to be measured is different from the that of the reference signal 80a, that is, when a bit error is detected, a signal having a logic value "1", is outputted from the output terminal 50OUT to the data input terminal 51IA of the gate circuit 51 as an error detection signal 50a. When it is detected that the bit of the signal 1a to be measured is the same as that of the reference signal 80a, that is, when a bit error is not detected, a signal having a logic value "0" is outputted from the output terminal 50OUT to the data input terminal 51IA of the gate circuit 51 as an error detection signal 50a. However, when the erroneous bits continue over two bits, the error detection circuit 50 does not generate the pulses corresponding to the number of the erroneous bits.

The gate circuit 51 comprises two data input terminals 51IA and 51IB, and an output terminal 51OUT. The error detection signal 50a outputted from the output terminal 50OUT of the error detection circuit 50 is inputted to the data input terminal 51IA. The clock signal 2a inputted into the terminal 2 is inputted to the data input terminal 51IB. The result of the AND operation of the error detection signal 50a inputted to the data input terminal 51IA and the clock signal 2a inputted to the data input terminal 51IB is outputted from the output terminal 51OUT to the clock terminal 60CLK of the error counter 60, to the clock terminal 32CLK of the address counter 32 and to the data input terminal 224Y of the switching circuit 224 as an error detection pulse signal 51a.

That is, while the logic value of the error detection signal 50a is "1", the gate circuit 51 outputs the error detection pulse signal 51a which is the same waveform as the clock signal 2a. As a result, when the erroneous bits continue over two bits, the gate circuit 51 generates the pulses corresponding to the number of the erroneous bits.

The error counter 60 comprises a clock terminal 60CLK, a reset terminal 60RST and an output terminal 60OUT. The error detection pulse signal 51a outputted from the output terminal 51OUT of the gate circuit 51 is inputted to the clock terminal 60CLK. The pull-in signal 5a inputted into the terminal 5 is inputted to the reset terminal 60RST.

When a logic value of the pull-in signal 5a inputted to the reset terminal 60RST is "0", that is, when the pull-in operation is carried out, the error counter 60 resets the counted number.

When a logic value of the pull-in signal 5a inputted to the reset terminal 60RST is "1", that is, when the pull-in operation is not carried out, the error counter 60 carries out the count-up operation by inputting the error detection pulse signal 51a to the clock terminal 60CLK and outputs the counted number from the output terminal 60OUT to the terminal 61 as a counted number 60a of errors. Subsequently, the counted number 60a of errors is outputted to the outside of the bit error measurement circuit 100.

That is, the error counter 60 counts erroneous bits after the pull-in operation.

The clock counter 70 comprises a clock terminal 70CLK, a reset terminal 70RST and an output terminal 70OUT. The clock signal 2a inputted into the terminal 2 is inputted to the clock terminal 70CLK. The pull-in signal 5a inputted into the terminal 5 is inputted to the reset terminal 70RST.

When a logic value of the pull-in signal 5a inputted to the reset terminal 70RST is "0", that is, when the pull-in operation is carried out, the clock counter 70 resets the counted number.

When a logic value of the pull-in signal 5a inputted to the reset terminal 70RST is "1", that is, when the pull-in operation is not carried out, the clock counter 70 carries out the count-up operation by inputting the clock signal 2a to the clock terminal 70CLK and outputs the counted number from the output terminal 70OUT to the terminal 71 as a counted number 70a of clock pulses. Subsequently, the counted number 70a of clock pulses is outputted to the outside of the bit error measurement circuit 100.

That is, the clock counter 70 counts the bits measured for a bit error after the pull-in operation. The bit error rate is calculated by dividing the number of the corrected erroneous bits, which is described hereinbelow, by the counted number.

The address counter 32 comprises a clock terminal 32CLK, a reset terminal 32RST and an output terminal 32OUT. The error detection pulse signal 51a outputted from the output terminal 51OUT of the gate circuit 51 is inputted to the clock terminal 32CLK. The notice of correction signal 7a inputted into the terminal 7 is inputted to the reset terminal 32RST.

When a logic value of the notice of correction 7a inputted to the reset terminal 32RST is "1", that is, when the correcting operation is carried out, the address counter 32 carries out the count-up operation by inputting the error detection pulse signal 51a to the clock terminal 32CLK and outputs the counted number to the data input terminal 225Y of the switching circuit 225 as an address number 32a.

When a logic value of the notice of correction signal 7a inputted to the reset terminal 32RST is "0", that is, when the correcting operation is not carried out, the address counter 32 resets the counted number.

That is, the address counter 32 counts up the address number of the memory circuit 22 when the bit error is detected, and assigns the address of the memory circuit 22 when data is written in the memory circuit 22.

The switching circuit 224 comprises two data input terminals 224X and 224Y, a switching signal input terminal 224SW and an output terminal 224OUT. The read-write control signal 24a inputted into the terminal 24 is inputted to the data input terminal 224x. The error detection pulse signal 51a outputted from the output terminal 51OUT of the gate circuit 51 is inputted to the data input terminal 224Y. The notice of correction signal 7a inputted into the terminal 7 is inputted to the switching signal input terminal 224SW.

When a logic value of the pull-in signal 7a inputted to the switching signal input terminal 224SW is "0", that is, when the correcting operation is not carried out, the output terminal 224OUT is connected with the data input terminal 224X in the switching circuit 224, so that the read-write control signal 24a inputted into the terminal 24 and thereafter inputted into the data input terminal 224X is outputted from the output terminal 224OUT to the read-write control signal input terminal 22RW of the memory circuit 22 as a read-write control signal 224a.

When a logic value of the pull-in signal 7a inputted to the switching signal input terminal 224SW is "1", that is, when the correcting operation is carried out, the output terminal 224OUT is connected with the data input terminal 224Y in the switching circuit 224, so that the error detection pulse signal 51a inputted to the data input terminal 224Y is outputted from the output terminal 224OUT to the read-write control signal input terminal 22RW of the memory circuit 22 as a read-write control signal 224a.

That is, during the correcting operation, the switching circuit 224 outputs the error detection pulse signal 51a to the memory circuit 22, so that the read-write control of the memory circuit 22 is carried out. On the other hand, after the correcting operation, the switching circuit 224 outputs the read-write control signal 24a inputted into the terminal 24 to the memory circuit 22, so that the memory circuit 22 can be controlled from the outside of the bit error measurement circuit 100.

The switching circuit 225 comprises two data input terminals 225X and 225Y, a switching signal input terminal 225SW and an output terminal 225OUT. The address number 25a inputted into the terminal 25 is inputted to the data input terminal 225X. The address number 32a outputted from the output terminal 32OUT of the address counter 32 is inputted to the data input terminal 225Y. The notice of correction signal 7a inputted into the terminal 7 is inputted to the switching signal input terminal 225SW.

When a logic value of the pull-in signal 7a inputted to the switching signal input terminal 225SW is "0", that is, when the correcting operation is not carried out, the output terminal 225OUT is connected with the data input terminal 225X in the switching circuit 225, so that the address number 25a inputted into the terminal 25 and thereafter inputted into the data input terminal 225X is outputted from the output terminal 225OUT to the address input terminal 22A of the memory circuit 22 as an address number 225a.

When a logic value of the pull-in signal 7a inputted to the switching signal input terminal 225SW is "1", that is, when the correcting operation is carried out, the output terminal 225OUT is connected with the data input terminal 225Y in the switching circuit 225, so that the address number 32a inputted into the data input terminal 225Y is outputted from the output terminal 225OUT to the address input terminal 22A of the memory circuit 22 as an address number 225a.

That is, during the correcting operation, the switching circuit 225 connects the address counter 32 with the memory circuit 22, so that the address of the memory circuit 22 is assigned. On the other hand, after the correcting operation, the switching circuit 225 outputs the address number 25a inputted into the terminal 25 to the memory circuit 22, so that the memory circuit 22 can be controlled from the outside of the bit error measurement circuit 100.

The memory circuit 22 comprises two data input-output terminals 22X and 22Y, an address input terminal 22A, a read-write control signal input terminal 22RW and a switching signal input terminal 22SW. The address number 30a outputted from the output terminal 30OUT of the address counter 30 is inputted to the data input-output terminal 22X. The address number 225a outputted from the output terminal 225OUT of the switching circuit 225 is inputted to the address input terminal 22A. The read-write control signal 224a outputted from the output terminal 224OUT of the switching circuit 224 is inputted to the read-write control signal input terminal 22RW. The notice of correction signal 7a inputted into the terminal 7 is inputted to the switching signal input terminal 22SW.

When a logic value of the pull-in signal 7a inputted to the switching signal input terminal 22SW is "0", that is, when the correcting operation is not carried out, similarly to FIG. 7, the switching circuit 202 of the inside of the memory circuit 22 connects the common terminal 202Z with the switching terminal 202Y. As a result, the memory circuit 22 outputs the data of the address which is indicated by the address number 225a inputted into the address input terminal 22A, from the data input-output terminal 22Y to the terminal 220 as memorized data 22a. Subsequently, the memorized data 22a is outputted to the outside of the bit error measurement circuit 100.

When a logic value of the pull-in signal 7a inputted to the switching signal input terminal 22SW is "1", that is, when the pull-in operation is carried out, similarly to FIG. 7, the switching circuit 202 of the inside of the memory circuit 22 connects the common terminal 202Z with the switching terminal 202X. As a result, the memory circuit 22 reads the address number 30a inputted to the address input-output terminal 22X, and writes the address number 30a to the address which is indicated by the address number 225a inputted to the address input terminal 22A, by the rise of the read-write control signal 224a.

That is, during the correcting operation, the memory circuit 22 memorizes the address of the erroneous bit memorized in the memory circuit 20 when the erroneous bit is detected. On the other hand, after the correcting operation, the memory circuit 22 is controlled from the outside of the bit error measurement circuit 100, so that the memory circuit 22 outputs the address of the erroneous bit, which is memorized therein, and provides the information to revise the counted number of the erroneous bits.

The period counter 90 comprises a clock counter 90CLK, a reset terminal 90RST and an output terminal 90OUT. The address carry-up signal 30b outputted from the carry-up signal output terminal 30C of the address counter 30 is inputted to the clock terminal 90CLK. The notice of correction signal 7a inputted into the terminal 7 is inputted to the reset terminal 90RST.

When a logic value of the notice of correction signal 7a inputted to the reset terminal 90RST is "0", that is, when the correcting operation is not carried out, the clock counter 90 resets the counted number.

When a logic value of the notice of correction signal 7a inputted to the reset terminal 90RST is "1", that is, when the correcting operation is carried out, the clock counter 90 carries out the count-up operation by inputting the address carry-up signal 30b to the clock terminal 90CLK, and outputs the counted number from the output terminal 90OUT to the terminal 91 as a counted number 90a of periods. Subsequently, the counted number 90a of periods is outputted to the outside of the bit error measurement circuit 100.

That is, the period counter 90 counts the number of the periods of the signal 1a measured for a bit error during the correcting operation, and provides the information to revise the counted number of the erroneous bits after the correcting operation.

Figure 2:
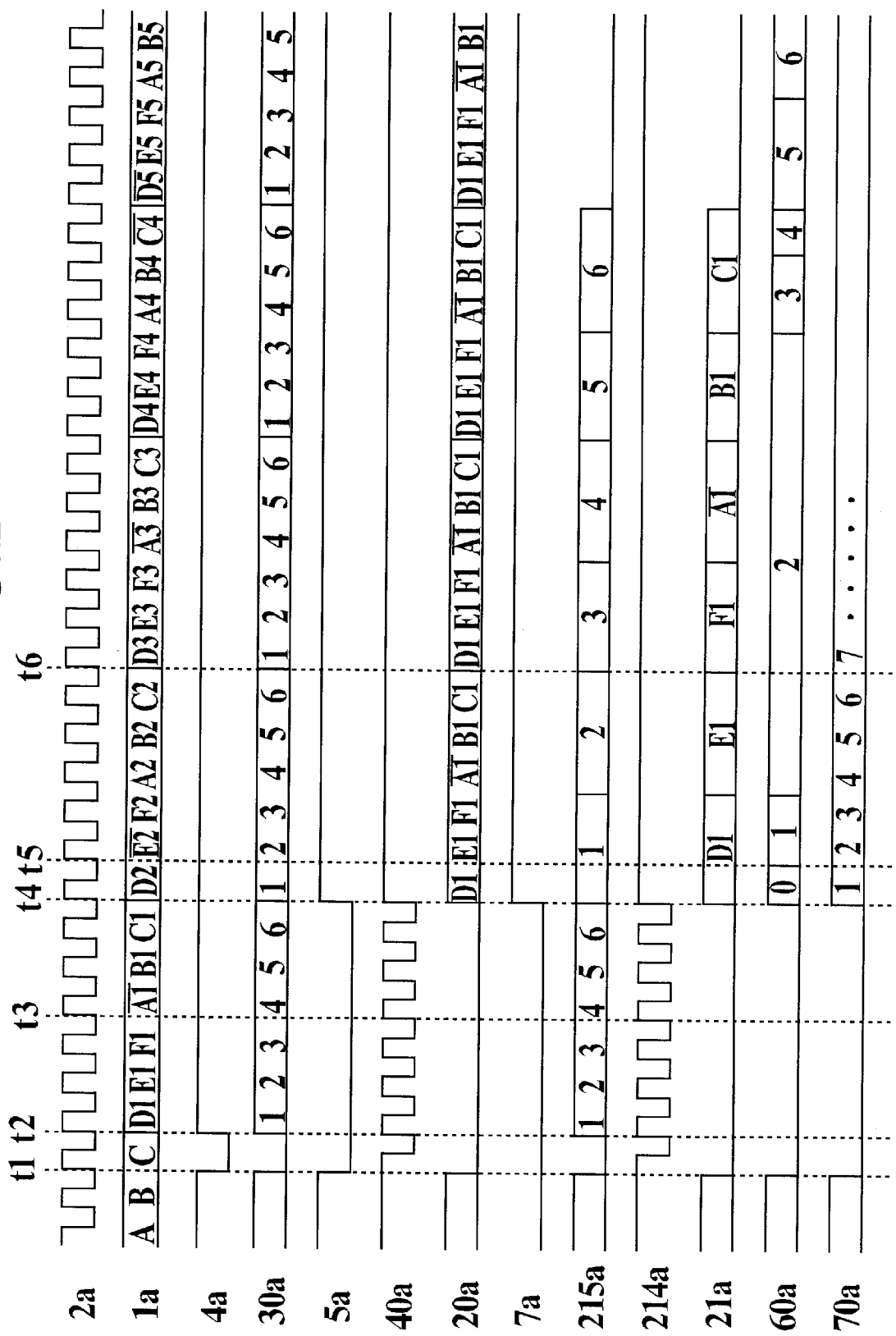
FIG. 2 is a time chart to explain the operations of the bit error measurement circuit shown in FIG. 1, wherein the time chart is the same time series as the time chart shown in FIG. 3.
Figure 3:
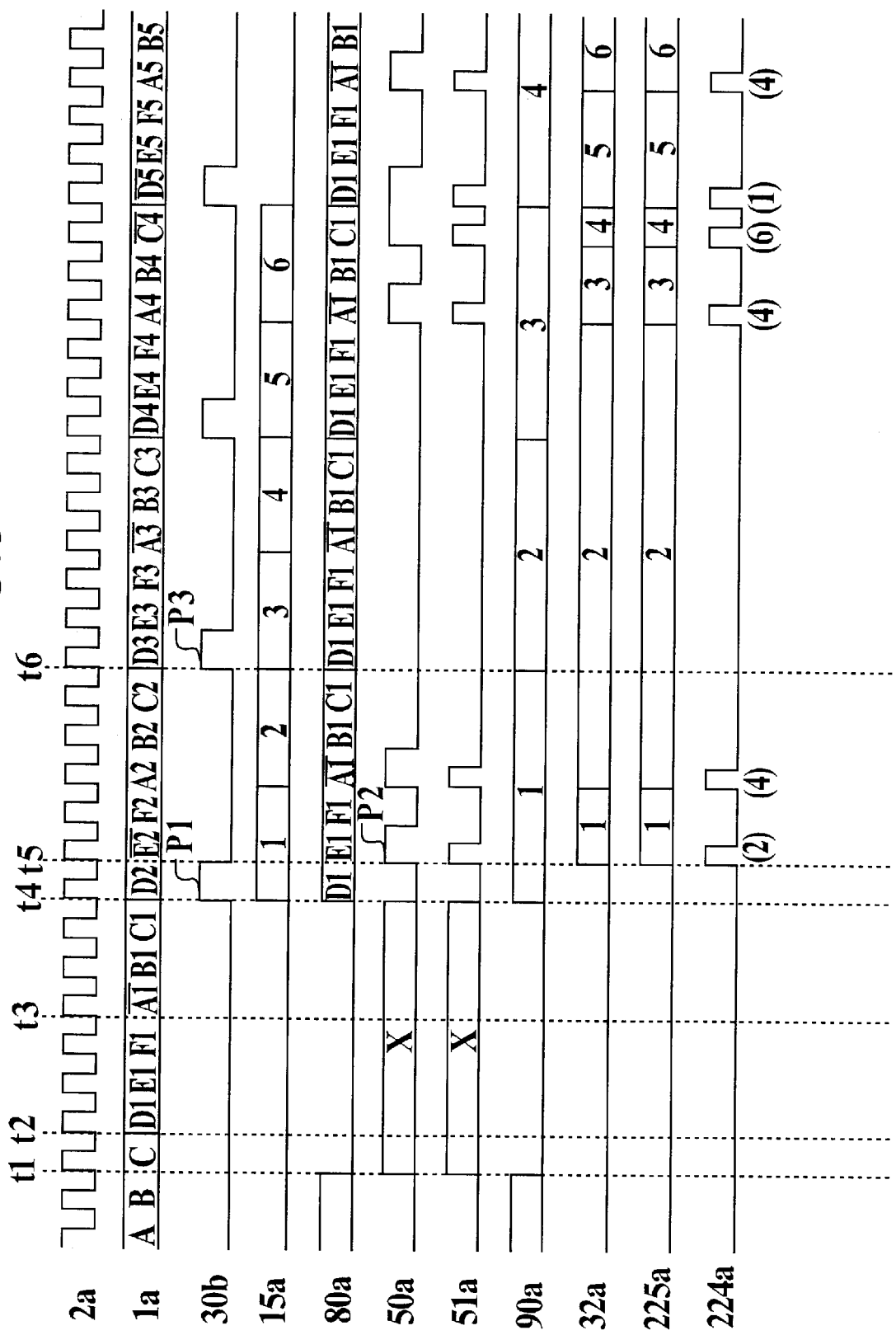
FIG. 3 is a time chart to explain the operations of the bit error measurement circuit shown in FIG. 1, wherein the time chart is the same time series as the time chart shown in FIG. 2.

The operation of the bit error measurement circuit 100 shown in FIG. 1 will be explained hereinbelow with reference to the time chart as shown in FIGS. 2 and 3.

The time chart of FIG. 2 is the same time series as that of FIG. 3. However, because of small space, the time chart is divided into two drawings.

In FIGS. 2 and 3, reference numeral 2a denotes a waveform illustration showing the clock signal, 1a denotes a waveform illustration showing the signal to be measured. In this case, the length of one period of the signal to be measured is 6 bits. The marks A to F and the period number denote each bit of the signal to be measured. For example, each bit of the first period is denoted by the marks D1, E1, F1, A1, B1 and C1, each bit of the second period is denoted by the marks D2, E2, F2, A2, B2 and C2, and the like. As shown in FIGS. 2 and 3, the period is from the first bit written in the memory circuit 20 and the memory circuit 21 to the last bit done. Therefore, the period is not necessarily coincident with a period which is determined on the basis of the first bit and the last bit of the pattern set by a transmission device. Further, in FIGS. 2 and 3, a line attached to the upper position of the mark indicates an erroneous bit. For example, because a line is attached to the upper position of the mark A3, the bit A3 is an erroneous bit.

In FIG. 2, the reference numeral 4a denotes a waveform illustration showing the address counter control signal. As shown in FIG. 2, when the logic value of the address counter control signal 4a is "0", the address counter 30 is reset. The reference numeral 30a denotes a waveform illustration showing the address number outputted by the address counter 30. The reference numeral 5a denotes a waveform illustration showing the pull-in signal. As shown in FIG. 2, when the logic value of the pull-in signal 5a is "0", the pull-in operation is carried out. The reference numeral 40a denotes a waveform illustration showing the read-write control signal of the memory circuit 20, 20a denotes a waveform illustration showing the error detection reference signal outputted by the memory circuit 20. The reference numeral 7a denotes a waveform illustration showing the notice of correction signal. As shown in FIG. 2, the logic value "1" indicates that the correcting operation of the error detection reference signal is carried out. The reference numeral 215a denotes a waveform illustration showing the address number inputted to the memory circuit 21, 214a denotes a waveform illustration showing the read-write control signal inputted to the memory circuit 21, 21a denotes a waveform illustration showing the error detection reference signal inputted and outputted by the memory circuit 21, 60a denotes a waveform illustration showing the counted number of errors, 70a denotes a waveform illustration showing the counted number of clock pulses.

The address number 3a of the address counter 30 is not shown. However, in this case, the address number 3a is a constant number "6" during the operation shown in the time chart.

Further, the read-write control signal 14a, the read-write control signal 24a and the address number 25a are not shown.

However, in this case, the logic value of the read-write control signal 14a is "1" and the logic values of the read-write control signal 24a and the address number 25a are "0" during the operation shown in the time chart.

In FIG. 3, the reference numeral 30b denotes a waveform illustration showing the address carry-up signal outputted by the address counter 30. The logic value of the address carry-up signal 30b keeps "0" except when the address counter 30 carries up. The reference numeral 15a denotes a waveform illustration showing the address number of the memory circuit 21, which is assigned from the outside of the bit error measurement circuit 100, 80a denotes a waveform illustration showing the reference signal outputted by the switching circuit 80, 50a denotes a waveform illustration showing the error detection signal, 51a denotes a waveform illustration showing the error detection pulse signal, 90a denotes a waveform illustration showing the counted number of periods, which is outputted by the period counter 90, 32a denotes a waveform illustration showing the address number outputted by the address counter 32, 225a denotes a waveform illustration showing the address number inputted to the memory circuit 22, 224a denotes a waveform illustration showing the read-write control signal inputted to the memory circuit 22. The number given in parenthesis, which is described at the lower position of the pulse signal in the waveform illustration showing the read-write control signal 224a, denotes the address number 30 written in the memory circuit 22.

The mark X described in the waveform illustration indicates an arbitrary number.

At the time t1, a signal having a logic value "0" is inputted to the reset terminal 30RST of the address counter 30 by converting the logic value "1" of the address counter control signal 4a inputted from the outside of the bit error measurement circuit 100 to the terminal 4 into the logic value "0" at the same time of the rise of the clock signal 2a, so that the address number 30a of the address counter 30 is reset. At the same time that the reset operation is carried out by the address counter control signal 4a, the logic value "1" of the pull-in signal 5a inputted from the outside of the bit error measurement circuit 100 to the terminal 5 is converted into the logic value "0", that is, the pull-in operation of the signal 1a to be measured is carried out.

By the logic value "0" of the pull-in signal 5a, the bit error measurement circuit 100 is operated as follows.

(1) A signal having a logic value "0" is inputted to the switching signal input terminal 40SW of the switching circuit 40, so that the output terminal 40OUT of the switching circuit 40 is connected with the data input terminal 40X in the switching circuit 40. At the same time, the clock signal 2a inputted into the data input terminal 40X is outputted from the output terminal 40OUT to the read-write control signal input terminal 20RW of the memory circuit 20 and to the data input terminal 214X of the switching circuit 214 as a read-write control signal 40a.

(2) A signal having a logic value "0" is inputted to the switching signal input terminal 20SW of the memory circuit 20, so that the switching circuit 202 of the inside of the memory circuit 20 connects the switching terminal 202X with the common terminal 202Z. At the same time, the signal 1a to be measured, which is inputted into the data input-output terminal 20X is inputted to the data input-output terminal 201D of the memory 201. Because the data input-output terminal 20Y is open, no data is outputted from the data input-output terminal 20Y. As a result, the logic value of the error detection reference signal 20a is "0".

(3) A signal having a logic value "0" is inputted to the switching signal input terminal 21SW of the memory circuit 21, so that the switching circuit 202 of the inside of the memory circuit 21 connects the switching terminal 202X with the common terminal 202Z. At the same time, the signal 1a to be measured, which is inputted into the data input-output terminal 21X is inputted to the data input-output terminal 201D of the memory 201. Because the data input-output terminal 21Y is open, no data is outputted from the data input-output terminal 21Y. As a result, the logic value of the error detection reference signal 21a is "0".

(4) A signal having a logic value "0" is inputted to the reset terminal 60RST of the error counter 60 and the reset terminal 70RST of the clock counter 70, so that the counted number 60a of errors and the counted number 70a of clock pulses are reset and each count operation is stopped.

Further, the logic value of the notice of correction 7a inputted from the outside of the bit error measurement circuit 100 to the terminal 7 is "0" that is, the correcting operation is not carried out, so that the bit error measurement circuit 100 is operated as follows.

(1) A signal having a logic value "0" is inputted to the switching signal input terminal 214SW of the switching circuit 214, so that the output terminal 214OUT of the switching circuit 214 is connected with the data input terminal 214X in the switching circuit 214. At the same time, the read-write control signal 40a inputted into the data input terminal 214X is outputted from the output terminal 214OUT to the read-write control signal input terminal 21RW of the memory circuit 21 as a read-write control signal 214a. Similarly, the address number 30a inputted into the data input terminal 215X is outputted from the output terminal 215OUT to the address input terminal 21A of the memory circuit 21 as an address number 215a.

(2) A signal having a logic value "0" is inputted to the switching signal input terminal 80SW of the switching circuit 80, so that the output terminal 80OUT is connected with the data input terminal 80X in the switching circuit 80. However, because the logic value of the reference signal 21a outputted from the data input-output terminal 21Y of the memory circuit 21 is "0", the logic value of the reference signal 80*a* outputted from the output terminal 80OUT of the switching circuit 80 is "0".

(3) Similarly, because the read-write control signal 24*a* inputted to the data input terminal 224X of the switching circuit 224 and the address number 25*a* inputted to the data input terminal 225X of the switching circuit 225 are inputted from the outside of the bit error measurement circuit 100 as signals having logic value "0", the logic values of the read-write control signal 224*a* which is outputted from the output terminal 224OUT of the switching circuit 224 to the read-write control signal input terminal 22RW of the memory circuit 22 and the address number 225*a* which is outputted from the output terminal 225OUT of the switching circuit 225 to the address input terminal 22A of the memory circuit 22 are "0".

(4) A signal having a logic value "0" is inputted to the reset terminal 32RST of the address counter 32 and to the reset terminal 90RST of the period counter 90, so that the address number 32*a* and the counted number 90*a* of periods are reset and each count-up operation is stopped.

Because the logic value of the reference signal 80*a* inputted to the data input terminal 50IB is "0" during the pull-in operation, there is possibility that the error detection circuit 50 outputs the error detection signal 50*a* as a signal having a logic value "1" (which is outputted when the erroneous bit is detected) by the result of the comparison between the signal 1*a* to be measured, which is inputted to the data input terminal 50IA and the reference signal 80*a*, and that the error detection pulse signal 51*a* is the same waveform as the clock signal 2*a*, so that it is indicated that the erroneous bit is detected. However, because the error counter 60 is reset and the count operation is stopped, the whole operation of the bit error detection circuit is not affected by the pull-in operation. Further, the logic value of the address number 15*a* inputted into the terminal 15 is "0".

At the time t2, a signal having a logic value "1" is inputted to the reset terminal 30RST of the address counter 30 by converting the logic value "0" of the address counter control signal 4*a* into the logic value "1" at the same time of the rise of the clock signal 2*a*, and the reset operation of the address counter 30 is canceled, so that the address counter 30 carries out the count-up operation by inputting the clock signal 2*a* to the clock terminal 30CLK and outputs the address number 30*a* counted by the address counter 30 from the output terminal 30OUT to the address input terminal 20A of the memory circuit 20, to the data input terminal 215X of the switching circuit 215 and to the data input-output terminal 22X of the memory circuit 22.

Because of the rise of the read-write control signal 40*a* (2*a*) inputted to the read-write control signal input terminal 20RW of the memory circuit 20 at the time t2, the memory circuit 20 writes the bit D1 which is inputted to the data input-output terminal 20X at the time t2, of the signal 1*a* to be measured to the address "1" of the memory 201, which is indicated by the address number 30*a* inputted to the address input terminal 20A by the address counter 30.

Subsequently, before the address number 30*a* counted by address counter 30 reaches the maximum address number 3*a* (=6) so that the address counter 30 carries up and generates the carry-up pulse which converts the logic value "0" of the carry-up signal 30*b* outputted from the carry-up signal output terminal 30C into the logic value "1", the rest of one period data of the signal 1*a* to be measured, that is, the bits E1 and F1, the erroneous bit A1 and the bits B1 and C1 are read and are written in the memory 201, similarly.

Because of the rise of the read-write control signal 214*a* (40*a* and 2*a*) inputted to the read-write control signal input terminal 21RW of the memory circuit 21 at the time t2, the memory circuit 21 writes the bit D1 which is inputted to the data input-output terminal 21X at the time t2, of the signal 1*a* to be measured to the address "1" of the memory 201, which is indicated by the address number 215*a* inputted to the address input terminal 21A by the switching circuit 215. As described above, similarly to the operation at the time t1, the read-write control signal 214*a* is the same waveform as the read-write control signal 40*a* and the address number 215*a* is the same as the address number 30*a*, so that the operation of the memory circuit 21 is the same as that of the memory circuit 20 at the time t2.

Subsequently, similarly to the memory circuit 20, before the address number 30*a* counted by the address counter 30 reaches the maximum address number 3*a* (=6) so that the address counter 30 carries up and generates the carry-up pulse which converts the logic value "0" of the carry-up signal 30*b* outputted from the carry-up signal output terminal 30C into the logic value "1", the rest of one period data of the signal 1*a* to be measured, that is, the bits E1 and F1, the erroneous bit A1 and the bits B1 and C1, are read and are written in the memory 201.

At the time t4, the address counter 30 counts up to the address number (=6) defined by the maximum address number 3*a*, so that the address carry-up pulse P1 is outputted from the carry-up signal output terminal 30C as an address carry-up signal 30*b*. At the same time that the address carry-up pulse P1 rises, the logic values of the pull-in signal 5*a* and the notice of correction signal 7*a* become "1". That is, the pull-in operation is finished and the correcting operation is started.

By the logic value "1" of the pull-in signal 5*a*, the bit error measurement circuit 100 is operated as follows.

(1) A signal having a logic value "1" is inputted to the switching signal input terminal 40SW of the switching circuit 40, so that the output terminal 40OUT of the switching circuit 40 is connected with the data input terminal 40Y in the switching circuit 40. At the same time, a signal having a logic value "1" (High-level signal "H") inputted into the data input terminal 40Y is outputted from the output terminal 40OUT to the read-write control signal input terminal 20RW of the memory circuit 20 and to the data input terminal 214X of the switching circuit 214 as a read-write control signal 40*a*. Because a signal fixed at a logic value "1" is inputted to the read-write control signal input terminal 20RW, the memory circuit 20 is fixed in the mode that the data memorized in the memory 201 are read out.

(2) A signal having a logic value "1" is inputted to the switching signal input terminal 20SW of the switching circuit 20, so that the switching circuit 202 of the inside of the memory circuit 20 connects the switching terminal 202Y with the common terminal 202Z. At the same time, the memory circuit 20 reads the data D1 written to the address "1" of the memory 201, which is indicated by the address number 30*a* inputted to the address input terminal 20A at the time t4 by the address counter 30, and outputs the data D1 from the data input-output terminal 20Y as an error detection reference signal 20*a*. Subsequently, as described above, the memory circuit 20 reads the data written in the memory 201 thereof. In FIG. 2, the bits D1, E1 and F1, the erroneous bit A1 and the bit B1 and C1 are written in the memory 201 of the memory circuit 20 from the time t2 to the time t4, and then these data are read out periodically and repeatedly. Similarly, the memory circuit 21 outputs the data from the data input-output terminal 21Y. The operation of the memory circuit 21 is described in detail hereinbelow.

(3) A signal having a logic value "1" is inputted to the reset terminal 60RST of the error counter 60 and the reset terminal 70RST of the clock counter 70, so that the reset operations of the error counter 60 and the clock counter 70 are canceled and each counter carries out the count-up operation.

By the logic value "1" of the pull-in signal 7a, the bit error measurement circuit 100 is operated as follows.

(1) A signal having a logic value "1" is inputted to the switching signal input terminal 80SW of the switching circuit 80, so that the output terminal 80OUT of the switching circuit 80 is connected with the data input terminal 80Y in the switching circuit 80. At the same time, the error detection reference signal 20a ("D1") inputted from the data input-output terminal 20Y of the memory circuit 20 to the data input terminal 80Y is outputted from the output terminal 80OUT to the data input terminal 50IB of the error detection circuit 50 as a reference signal 80a.

(2) A signal having a logic value "1" is inputted to the switching signal input terminal 214SW of the switching circuit 214, so that the output terminal 214OUT of the switching circuit 214 is connected with the data input terminal 2 14Y in the switching circuit 214. At the same time, the read-write control signal 14a (fixed at the logic value "1") inputted into the terminal 14 and thereafter inputted into the data input terminal 214Y is outputted from the output terminal 214OUT to the read-write control signal input terminal 21RW of the memory circuit 21 as a read-write control signal 214a. Similarly, the address number 15a (=1) inputted into the terminal 15 and thereafter inputted into the data input terminal 215Y is outputted from the output terminal 215OUT to the address input terminal 21A as an address number 215a. Therefore, the memory circuit 21 can be controlled by the read-write control signal 14a and the address number 15a inputted from the outside of the bit error measurement circuit 100. Because the read-write control signal 14a is fixed at the logic value "1", the memory circuit 21 is fixed in the mode that the data memorized in the memory 201 are read out. As shown in FIG. 2, the bits D1, E1 and F1, the erroneous bit A1 and the bits B1 and C1 are written in the memory 201 of the memory circuit 20 from the time t2 to the time t4, and then these data are outputted from the data input-output terminal 21Y to the terminal 210 as an error detection reference signal 21a correspondingly to the address indicated by the address number 15a. The error detection reference signal 21a outputted to the terminal 210 is outputted from the terminal 210 to the outside of the bit error measurement circuit 100. Subsequently, the error detection reference signal 21a is inspected and is corrected outside the bit error measurement circuit 100.

(3) A signal having a logic value "1" is inputted to the reset terminal 32RST of the address counter 32 and to the reset terminal 90RST of the period counter 90, so that the reset operations of the address counter 32 and the period counter 90 are canceled and each count-up operation is started. That is, the address counter 32 gives an address number to the memory circuit 22 which memorizes the address of the erroneous bit memorized in the memory circuit 20, when the erroneous bit is detected. Therefore,the address counter 32 counts the erroneous bits virtually. The period counter 90 counts the number of periods of the signal 1a to be measured during the correcting operation.

(4) A signal having a logic value "1" is inputted to the switching signal input terminal 224SW of the switching circuit 224, so that the output terminal 224OUT of the switching circuit 224 is connected with the data input terminal 224Y in the switching circuit 224. At the same time, the error detection pulse signal 51a inputted into the data input terminal 224Y is outputted from the output terminal 224OUT to the read-write control signal input terminal 22RW of the memory circuit 22 as a read-write control signal 224a. Similarly, the switching circuit 225 outputs the address number 32a inputted into the data input terminal 225Y from the output terminal 225OUT to the address input terminal 22A of the memory circuit 22 as an address number 225a.

At the time t5, the erroneous bit E2 of the signal 1a to be measured is inputted to the data input terminal 50IA of the error detection circuit 50. Similarly, the correct bit E1 of the reference signal 80a (20a) is inputted from the switching circuit 80 to the data input terminal 50IB of the error detection circuit 50. As a result, the error detection circuit 50 outputs an error detection pulse P2 from the output terminal 50OUT as an error detection signal 50a. The error detection pulse P2 is inputted to the data input terminal 51IA of the gate circuit 51 as the error detection signal 50a, so that the result of AND operation of the error detection signal 50a and the clock signal 2a inputted into the data input terminal 51IB is outputted from the output terminal 51OUT to the clock terminal 60CLK of the error counter 60, to the clock terminal 32CLK of the address counter 32 and to the data input terminal 224Y of the switching circuit 224 as an error detection pulse signal 51a. The error detection pulse signal 51a is the same waveform as the clock signal 2a while the logic value of the error detection signal 50a is "1". Therefore, when the erroneous bits continue over two bits, the error detection circuit 50 generates only one pulse, however, the gate circuit 51 generates the pulses corresponding to the number of the erroneous bits.

The error counter 60 counts up the counted number 60a of errors by inputting the error detection pulse signal 51a from the output terminal 51OUT of the gate circuit 51 to the clock terminal 60CLK. Similarly, the address counter 32 counts up the address number 32a by inputting the error detection pulse signal 51a from the gate circuit 51 to the clock counter 32CLK.

The memory circuit 22 writes the address number 30a (=2) inputted from the output terminal 30OUT of the address counter 30 to the data input-output terminal 22X as data for a position of an erroneous bit to the address of the memory 201, which is indicated by the address number 225a (32a) inputted to the address input terminal 22A by the rise of the read-write control signal 224a (51a) inputted to the read-write control signal input terminal 22RW.

That is, the memory circuit 22 memorizes the address of the first erroneous bit memorized in the memory circuit 20 to the address "1", and memorizes the address of the second erroneous bit memorized in the memory circuit 20 to the address "2". Similarly, the memory circuit 22 memorizes the address of the nth erroneous bit memorized in the memory circuit 20 to the address "n".

At the time t6, the address counter 30 counts the address number 30a up to the address number (=6) defined by the maximum address number 3a, so that the address counter 30 outputs the address carry-up pulse P3 from the carry-up signal output terminal 30C as an address carry-up signal 30b. Thereby, the counted number 90a of periods is counted up.

Subsequently, because of the periodic repeat of the above-described operation, the time chart has the waveforms as shown in FIGS. 2 and 3, so that the bit error measurement is continued.

The input operation of the correction signal for the bit error measurement circuit 100 shown in FIG. 1 will be explained with reference to the time chart shown in FIGS. 4 and 5.

Figure 4:
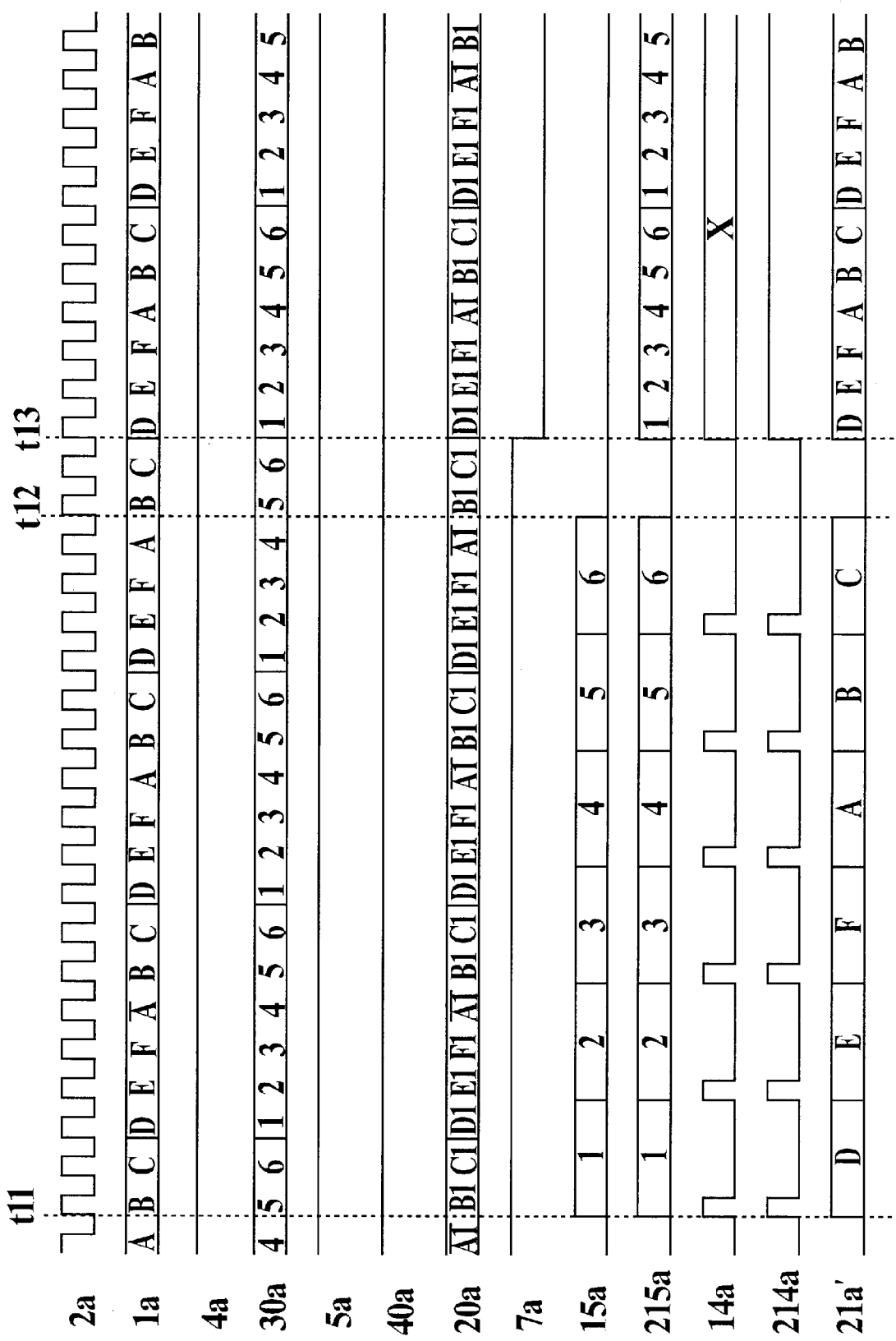
FIG. 4 is a time chart to explain the correcting operation and the revising operation of the counted number of the errors, wherein the time chart is the same time series as the time chart shown in FIG. 5.
Figure 5:
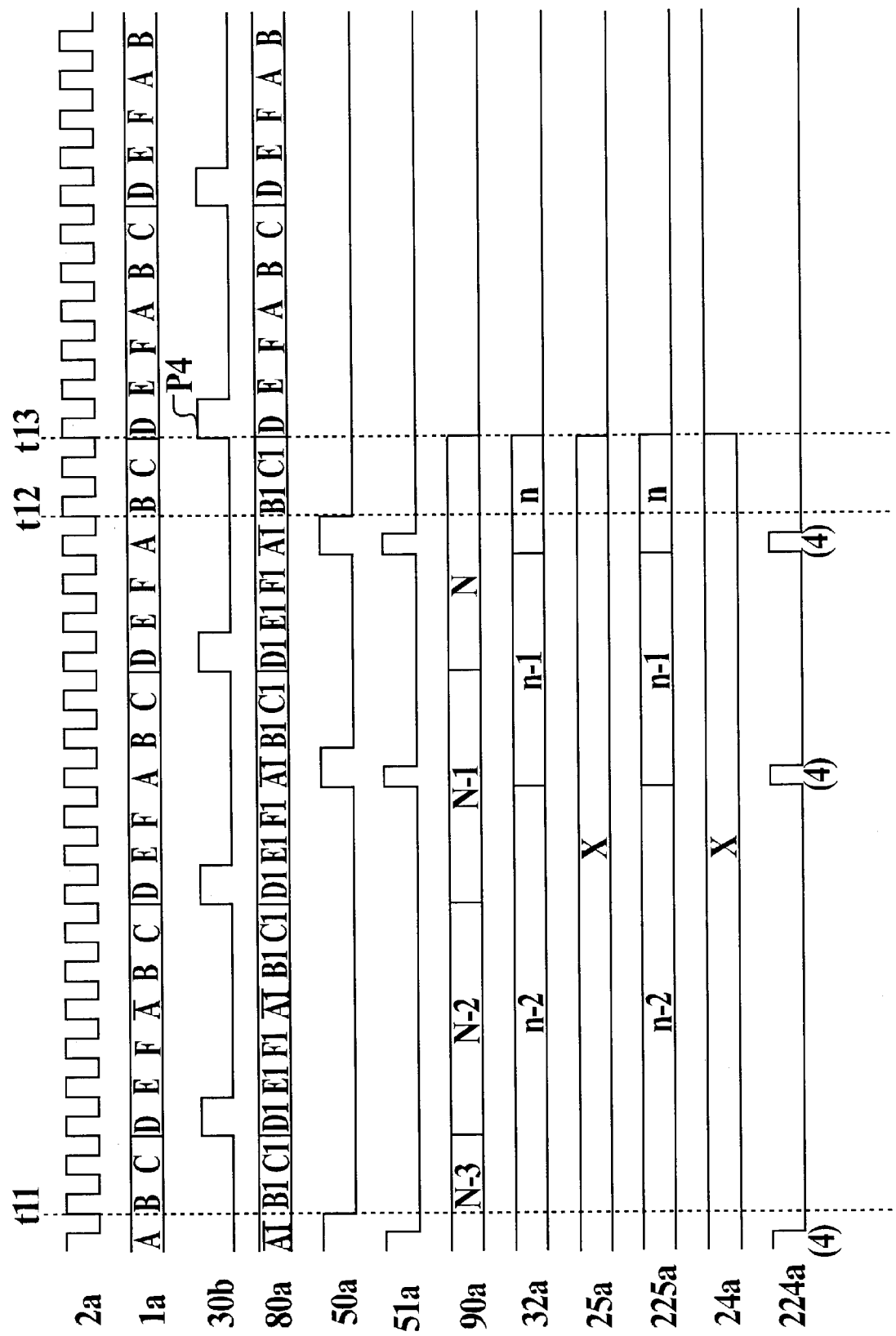
FIG. 5 is a time chart to explain the correcting operation and the revising operation of the counted number of the errors, wherein the time chart is the same time series as the time chart shown in FIG. 4.

The time chart of FIG. 4 is the same time series as that of FIG. 5. However, because of small space, the time chart is divided into two drawings.

In FIG. 4, the reference numeral 14*a* denotes a waveform illustration showing the read-write control signal of the memory circuit 21, which is designated from the outside, and 21*a*' denotes a waveform illustration showing the corrected error detection reference signal. In FIG. 5, the reference numeral 25*a* denotes a waveform illustration showing the address number of the memory circuit 22, which is designated from the outside, and 24*a* denotes a waveform illustration showing the read-write control signal of the memory circuit 22, which is designated from the outside. The mark X described in the waveform illustration indicates an arbitrary number.

In FIGS. 4 and 5, because the reference numerals denoting the other signals are the same as those of FIGS. 2 and 3, the explanations of the numerals are omitted. However, in FIG. 4, the waveform illustrations of the counted number 60*a* of errors and the counted number 70*a* of clock pulses shown in FIG. 2 are omitted.

From the time t11 to the time t12, because the correcting operation of the error detection reference signal 21*a* is carried out, the logic value of the notice of correction signal 7*a* is "1". The read-write control signal 14*a*, the address number 15*a* and the corrected error detection reference signal 21*a*' is inputted from the outside at the time shown is FIG. 4. That is, at the time t11, a signal "1" is inputted as the address number 15*a*, a signal "D" corresponding to the address "1" is inputted as the corrected error detection signal 21*a*' and the read-write control signal 14*a* is inputted in order to write the corrected error detection signal 21*a*' ("D") to the address ("1") indicated by the address number 15*a*.

At the same time, the switching circuit 214 connects the output terminal 214OUT with the input terminal 214Y by the logic value "1" of the notice of correction signal 7*a*, so that the read-write control signal 14*a* inputted from the outside and thereafter inputted into the input terminal 214Y is outputted from the output terminal 214OUT to the read-write control signal input terminal 21RW of the memory circuit 21 as the read-write control signal 214*a*. Similarly, the address number 15*a* is outputted to the address input terminal 21A of the memory circuit 21 as the address number 215*a*.

A signal having a logic value "1" is inputted to the switching signal input terminal 21SW of the memory circuit 21 by the logic value "1" of the pull-in signal 5*a* inputted into the terminal 5, so that the switching circuit 202 of the inside of the memory circuit 21 connects the switching terminal 202Y with the common terminal 202Z. As a result, the corrected detection signal 21*a*' inputted into the terminal 210 and thereafter inputted into the data input-output terminal 21Y is read by the memory circuit 21. At the same time, the memory circuit 21 writes the corrected error detection signal 21*a*' inputted into the data input terminal 21Y to the address of the memory 201, which is indicated by the address number 215*a* (15*a*) inputted to the address input terminal 21A, by the rise of the read-write control signal 214*a* (14*a*) inputted to the read-write control signal terminal 21RW.

Subsequently, until the time t12 that one period of the signal data has been written, the above-described operation is carried out repeatedly.

After all the corrected reference signal data were written, at the time t13, the address carry-up pulse P4 is generated by the address counter 30 and is outputted from the carry-up signal output terminal 30C of the address counter 30 as the carry-up signal 30*b*. At the same time, the logic value "1" of the notice of correction signal 7*a* is convert into the logic value "0", that is, the finish of the correcting operation is noticed.

At the time t13, a signal having a logic value "1" is inputted to the switching signal input terminal 40SW of the switching circuit 40 by the logic value "1" of the pull-in signal 5*a*, so that the switching circuit 40 connects the output terminal 40OUT with the input terminal 40Y. At the same time, the signal of the logic value "1" (High-level signal "H") inputted to the data input terminal 40Y is outputted from the output terminal 40OUT to the data input terminal 214X of the switching circuit 214 as a read-write control signal 40*a*.

By the logic value "0" of the pull-in signal 7*a*, the bit error measurement circuit 100 is operated as follows.

(1) A signal having a logic value "0" is inputted to the switching signal input terminal 214SW of the switching circuit 214, so that the output terminal 214OUT of the switching circuit 214 is connected with the data input terminal 214X in the switching circuit 214. At the same time, the error detection reference signal 40*a* (fixed at the logic value "1") inputted into the data input terminal 214X is outputted from the output terminal 214OUT to the read-write control signal input terminal 21RW of the memory circuit 21 as a read-write control signal 214*a*. The signal inputted to the read-write control signal input terminal 21RW is fixed at the logic value "1", so that the memory circuit 21 is fixed in the mode that the data memorized in the memory 201 are read out.

(2) Similarly, the switching circuit 215 outputs the address number 30*a* inputted into the data input terminal 215X from the output terminal 215OUT to the address input terminal 21A of the memory circuit 21 as an address number 215*a*. A signal having the logic value "1" is inputted to the switching signal input terminal 21SW of the switching circuit 21 as the pull-in signal 5*a*, so that the switching circuit 202 of the memory circuit 21 connects the switching terminal 202Y with the common terminal 202Z. At the same time, the memory circuit 21 reads out the data written to the address of the memory circuit 201, which is indicated by the address number 215*a* (30*a*) inputted from the switching circuit 215 to the address input terminal 21A at the time t13, and outputs the data from the output terminal 21Y. Subsequently, similarly to the above-described operation, the memory circuit 21 reads out the data written in the memory 201. In FIG. 4, the bits D, E, F, A, B and C are written in the memory circuit 21 from the time t11 to the time t12 as the corrected error detection signal 21*a*', and then these data are read out periodically and repeatedly.

(3) A signal having a logic value "0" is inputted to the switching signal input terminal 80SW of the switching circuit 80, so that the output terminal 80OUT of the switching circuit 80 is connected with the data input terminal 80X in the switching circuit 80. At the same time, the corrected error detection reference signal 21*a*' inputted into the data input-output terminal 80Y is outputted from the output terminal 80OUT to the data input terminal 50IB of the error detection circuit 50 as a reference signal 80*a*.

(4) Similarly to the switching circuit 80, in the case of the switching circuit 224 and the switching circuit 225, each output terminal OUT is connected with each data input terminal X, so that the read-write control signal 24a inputted into the data input terminal 224X of the switching circuit 224 and the address number 25a inputted into the data input terminal 225X of the switching circuit 225 control the memory circuit 22 from the outside of the bit error measurement circuit 100 as the read-write control signal 224a outputted from the output terminal 224OUT of the switching circuit 224 to the read-write control signal input terminal 22RW of the memory circuit 22 and as the address number 225a outputted from the output terminal 225OUT of the switching circuit 225 to the address input terminal 22A of the memory circuit 22, respectively.

(5) A signal having a logic value "0" is inputted to the reset terminal 32RST of the address counter 32 and to the reset terminal 90RST of the period counter 90, so that the address counter 32 and the period count 90 are reset and each count-up operation is stopped. The counted number 90a of periods counted by the period counter 90 is outputted from the terminal 91 to the outside of the bit error measurement circuit 100, and thereafter the number counted until the time that the count operation is stopped is memorized outside.

As a result, the erroneous bit A1 memorized as the error detection reference signal at the time t3 as shown in FIGS. 2 and 3 is changed to the correct bit A, and the corrected signal is used as the reference signal, so that the correct measurement is carried out.

The revising operation which is carried out after the time t13, for revising the result of the bit error measurement during the correcting operation of the reference signal data will be explained.

As shown in FIGS. 2 to 5, the error detection reference signal which is generated by memorizing the signal 1a to be measured in the memory circuit 20, has an erroneous bit at the bit A1 of the address "4". Therefore, during the inspection and the correction of the error detection reference signal, that is, while the logic value of the notice of correction signal 7a is "1" from the time t3 to the time t13, the error detection circuit 50 detects the bit error by using the erroneous bit A1. That is, the counted number of errors counted by the error counter 60 from the time t3 to the time t13 is obviously an erroneous data. From the above-described reason, the revising operation described as follows is carried out, so that the correct data is obtained.

The period counter 90 counts the number of periods of the signal 1a which was measured for a bit error during the correcting operation, that is, while the logic value of the notice of correction signal 7a is "1" from the time t3 to the time t13. The counted number is memorized outside the bit error measurement circuit as the counted number 90a of periods. In FIG. 5, the counted number 90a of periods is N. The memory circuit 22 memorizes the address of the erroneous bit memorized in the memory circuit 20, when the erroneous bit is detected during the correcting operation, that is, while the logic value of the notice of correction signal 7a is "1" from the time t3 to the time t13. In those addresses, the number of the address "4" to which the erroneous bit A1 is memorized in the memory circuit 20 as the error detection reference signal, is counted, and the number is regarded as "i". The "i" is the number of the correct bits which are judged to be the erroneous bits. On the other hand, the number of the erroneous bits which are judged to be the correct bits, that is, the true number of the erroneous bits counted from the time t3 to the time t13 is "N−i". Therefore, when the counted number 60a of errors counted by the error counter 60 of the bit error measurement circuit 100 is "M", the revised number of errors "E" is expressed by calculating the "M−i+(N−i)", as follows.

$$E = M + (N - 2i)$$

As described above, in the embodiment of the present invention, the bit error measurement circuit comprises the functions as follows. Between the two error detection reference signal written in the memory circuit 20 and the memory circuit 21 on the basis of the signal 1a to be measured, it is inspected outside the bit error measurement circuit 100 whether the error detection reference signal 21a written in the memory circuit 21 has an erroneous bit. When the error detection reference signal has an erroneous bit, the error detection reference signal 21a can be corrected. As a result, the correct bit error measurement can be carried out. The memory circuit 20 and the memory circuit 21 comprise the memory for writing the signal 1a to be measured, so that the measurement and the correction can be carried out simultaneously. Further, the result of the measurement carried out during the correcting operation of the error detection reference signal 21a is memorized in the memory circuit 22 and is revised by using the result of the correcting operation, so that the bit error measurement can be carried out during the correcting operation of the reference signal data precisely.

What is claimed is:

1. A bit error measurement circuit comprising:

a first memory circuit for memorizing one period data of a signal to be measured as a reference signal;

an error detection circuit for detecting erroneous bits of the signal to be measured by comparing the signal to be measured with the reference signal memorized in the first memory circuit;

an error counter for counting the number of the erroneous bits of the signal to be measured that are detected by the error detection circuit; and a plurality of terminals for inputting control signals used to output the reference signal memorized in the first memory circuit to an outside of the bit error measurement circuit and to correct erroneous bits of the reference signal memorized in the memory circuit from outside of the bit error measurement circuit;

wherein an inspecting operation determines whether the reference signal memorized in the first memory circuit has at least one erroneous bit by outputting the reference signal memorized in the first memory circuit to the outside of the bit error measurement circuit on the basis of the control signal inputted into the first memory circuit and a correcting operation corrects the erroneous bits of the reference signal memorized in the first memory circuit by inputting the control signal from the outside of the bit error-measurement circuit when the reference signal has at least one erroneous bit;

a second memory circuit for memorizing data which is the same as the data memorized in the first memory circuit, as the reference signal; and a selection circuit for selecting any one of the reference signals outputted from the first memory circuit and the reference signal outputted from the second memory circuit, and for outputting the selected reference signal to the error detection circuit;

wherein while the inspecting operation and the correcting operation are carried out, the selection circuit selects the reference signal memorized in the second memory circuit and outputs it to the error detection circuit, the reference signal memorized in the second memory circuit is used for detecting the erroneous bits of the signal to be measured;

a third memory circuit for memorizing an address number of the erroneous bit of the signal to be measured which is detected by using the reference signal memorized in the second memory circuit while the inspecting operation and the correcting operation are performed;

a plurality of terminals for inputting control signals to control the third memory circuit from the outside of the bit error measurement circuit; and a period counter for counting the number of periods of the signal to be measured while the inspecting operation and the correcting operation are carried out;

wherein the number of the erroneous bits of the signal to be measured, which is counted by the error counter while the inspecting operation and the correcting operation are carried out is revised by using the address number memorized in the third memory circuit, the counted number of periods in the period counter, and a reference signal erroneous bit address number for specifying a location of an erroneous bit of the reference signal memorized in the first memory circuit which is detected by carrying out the inspecting operation.

2. A bit error measurement circuit as claimed in claim 1, wherein a construction of the first memory circuit is the same as that of the second memory circuit.

3. A bit error measurement circuit as claimed in claim 1, wherein a construction of the first memory circuit is the same as that of the third memory circuit.

4. A bit error measurement circuit as claimed in claim 1, wherein a construction of the second memory circuit is the same as that of the third memory circuit.

5. A bit error measurement circuit comprising:

a first memory circuit for memorizing one period data of a signal to be measured as a reference signal for detecting erroneous bits of the signal to be measured;

an output terminal for outputting the reference signal outside the bit error measurement circuit;

an input terminal for inputting a corrected reference signal into the bit error measurement circuit;

a detection circuit for detecting erroneous bits of the signal to be measured by using the corrected reference signal; and a count circuit for counting the number of the erroneous bits of the signal to be measured, wherein the corrected reference signal is memorized in the first memory circuit;

a second memory circuit for memorizing a reference signal which is the same as the reference signal memorized in the first memory circuit; and a selection circuit for selecting any one of the reference signal outputted from the first memory circuit and the reference signal outputted from the second memory circuit, and for outputting the selected reference signal to the detection circuit, wherein while the reference signal memorized in the first memory circuit is outputted and corrected, the selection circuit selects the reference signal memorized in the second memory circuit and outputs it to the detection circuit and the reference signal memorized in the second memory circuit is used for detecting the erroneous bits of the signal to be measured;

a third memory circuit for memorizing an address number of the erroneous bit of the signal to be measured, which is detected by using the reference signal memorized in the second memory circuit while the reference signal memorized in the first memory circuit is outputted and corrected; and a period counter for counting the number of periods of the signal to be measured, while the reference signal memorized in the first memory circuit is outputted and corrected, wherein the number of the erroneous bits of the signal to be measured, which is counted by the count circuit while the reference signal memorized in the first memory circuit is outputted and corrected, is revised by using the address number memorized in the third memory circuit, the counted number of periods in the period counter, and a reference signal erroneous bit address number for specifying a location of an erroneous bit of the reference signal memorized in the first memory circuit, which is detected while the reference signal memorized in the first memory circuit is outputted.

6. A bit error measurement circuit as claimed in claim 5, wherein a construction of the first memory circuit is the same as that of the second memory circuit.

7. A bit error measurement circuit as claimed in claim 5, wherein a construction of the first memory circuit is the same as that of the third memory circuit.

8. A bit error measurement circuit as claimed in claim 5, wherein a construction of the second memory circuit is the same as that of the third memory circuit.

* * * * *